US012690019B2

(12) United States Patent     (10) Patent No.:    US 12,690,019 B2

Khoshnevisan et al.     (45) Date of Patent:     Jul. 21, 2026

(54) TRANSMISSION CONFIGURATION INDICATOR STATES FOR DIFFERENT OPERATING STATES

(71) Applicant: QUALCOMM Incorporated, San Diego, CA (US)

(72) Inventors: Mostafa Khoshnevisan, San Diego, CA (US); Muhammad Sayed Khairy Abdelghaffar, San Jose, CA (US); Jing Sun, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 18/191,690

(22) Filed: Mar. 28, 2023

(65) Prior Publication Data

US 2024/0334401 A1     Oct. 3, 2024

(51) Int. Cl.
*H04W 72/044*     (2023.01)
*H04W 72/0446*     (2023.01)

(52) U.S. Cl.
CPC ..... *H04W 72/0446* (2013.01); *H04W 72/046* (2013.01)

(58) Field of Classification Search
CPC ..... H04B 7/06952; H04L 5/16; H04L 5/0053; H04L 5/14; H04L 5/0023; H04W 72/046; H04W 72/0446
See application file for complete search history.

(56) References Cited

U.S. PATENT DOCUMENTS

| | | | | |
|---|---|---|---|---|
| 2021/0203469 A1* | 7/2021 | Abedini | ............... | H04W 72/56 |
| 2021/0227550 A1* | 7/2021 | Ly | .......... | H04W 72/53 |
| 2021/0289525 A1* | 9/2021 | Khoshnevisan | ........ | H04L 1/189 |
| 2021/0385056 A1* | 12/2021 | Zhou | ..................... | H04W 72/23 |
| 2021/0410147 A1* | 12/2021 | Xu | .......... | H04W 80/02 |
| 2021/0410172 A1* | 12/2021 | Xu | .......... | H04W 72/23 |
| 2022/0021436 A1* | 1/2022 | Zhang | .................. | H04B 7/0695 |
| 2022/0150928 A1* | 5/2022 | Choi | ......................... | H04L 1/08 |
| 2022/0231808 A1* | 7/2022 | Oh | ..................... | H04L 25/0224 |
| 2022/0407669 A1 | 12/2022 | Zhang et al. | | |
| 2023/0015915 A1 | 1/2023 | Zhang et al. | | |
| 2023/0125714 A1* | 4/2023 | Lee | ................... | H04W 72/0446 |
| | | | | 370/277 |
| 2024/0348310 A1* | 10/2024 | Nilsson | ............... | H04B 7/0697 |

OTHER PUBLICATIONS

International Search Report and Written Opinion—PCT/US2024/018498—ISA/EPO—May 23, 2024.

* cited by examiner

*Primary Examiner* — Andrew Lee

(74) *Attorney, Agent, or Firm* — Harrity & Harrity LLP

(57)     ABSTRACT

Various aspects of the present disclosure generally relate to wireless communication. Some aspects relate to transmission configuration indicator (TCI) states associated with different operating states of a network node. Some aspects more specifically relate to a TCI state that includes an indication of an associated operating state of the network node. In some aspects, a UE may apply the TCI state during a time interval that is associated with the operating state. For example, the UE may receive an indication that a time interval is associated with the operating state of the network node. The UE may identify an operating state associated with a current time interval and may apply a corresponding TCI state that is associated with the operating state.

30 Claims, 17 Drawing Sheets

800 ——▸

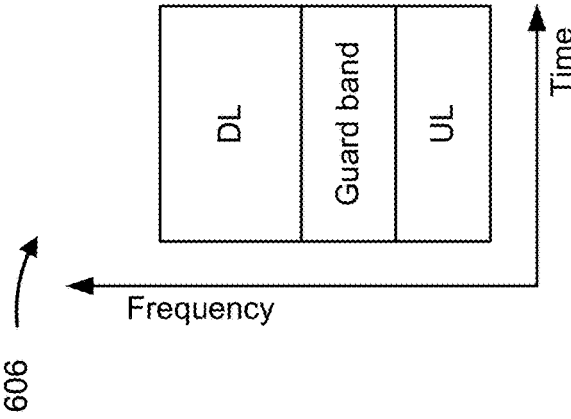
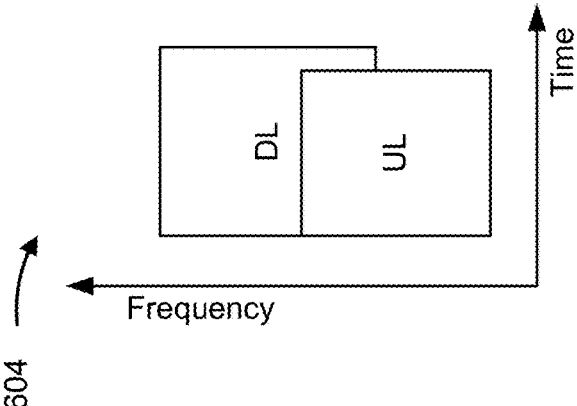
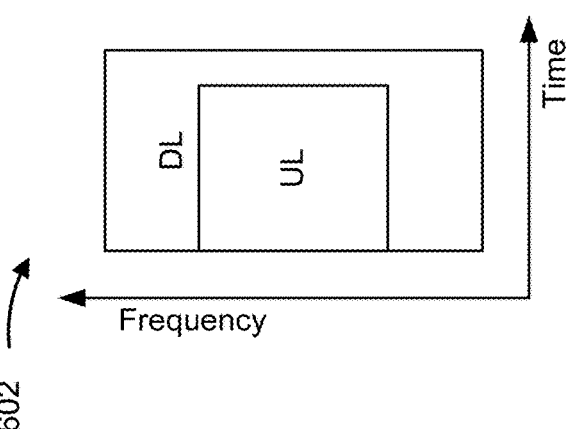
FIGURE 6

| <u>1205</u><br>TCI Codepoint | <u>1210</u><br>TCI State | <u>1215</u><br>Duplex Mode |
|---|---|---|
| 0 (000) | DL TCI state 1, UL TCI state 1 | Non-full-duplex |
| | DL TCI state 1, UL TCI state 2 | Full-duplex |
| 1 (001) | DL TCI state 1, UL TCI state 1 | Non-full-duplex |
| | DL TCI state 2, UL TCI state 1 | Full-duplex |
| 2 (010) | DL TCI state 2, UL TCI state 2 | Non-full-duplex |
| | DL TCI state 1, UL TCI state 2 | Full-duplex |
| ⋮ | ⋮ | ⋮ |

1315
TCI states for full-duplex

| 1320 TCI Codepoint | 1325 TCI State |
|---|---|
| 0 (000) | DL TCI state 1, UL TCI state 1 |
| 1 (001) | DL TCI state 1, UL TCI state 2 |
| 2 (010) | DL TCI state 2, UL TCI state 1 |
| 3 (011) | DL TCI state 4, UL TCI state 2 |
| ⋮ | ⋮ |

1300
TCI states for non-full-duplex

| 1305 TCI Codepoint | 1310 TCI State |
|---|---|
| 0 (000) | Joint unified TCI state 1 |
| 1 (001) | Joint unified TCI state 2 |
| 2 (010) | Joint unified TCI state 3 |
| 3 (011) | Joint unified TCI state 2 |
| ⋮ | ⋮ |

FIGURE 13

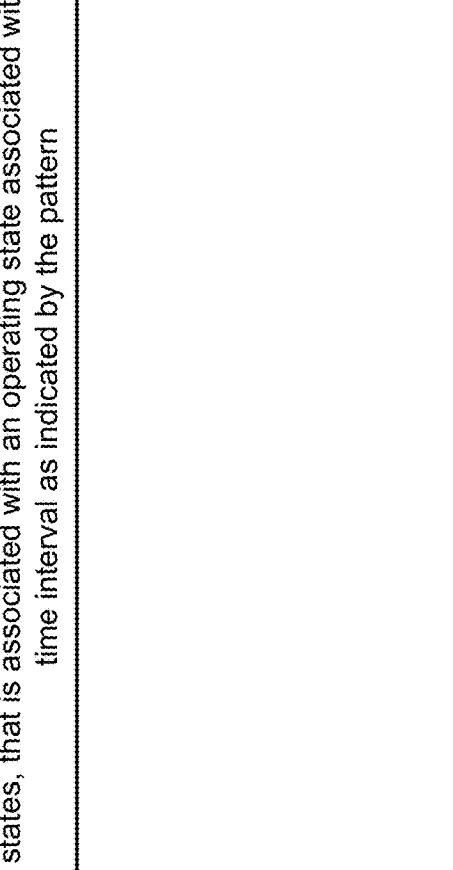

Receive a first communication that activates one or more transmission configuration indicator (TCI) states associated with respective operating states that are associated with a pattern indicating time intervals associated with the respective operating states Transmit or receive, during a time interval of the time intervals, a second communication using a TCI state, of the one or more TCI states, that is associated with an operating state associated with the time interval as indicated by the pattern

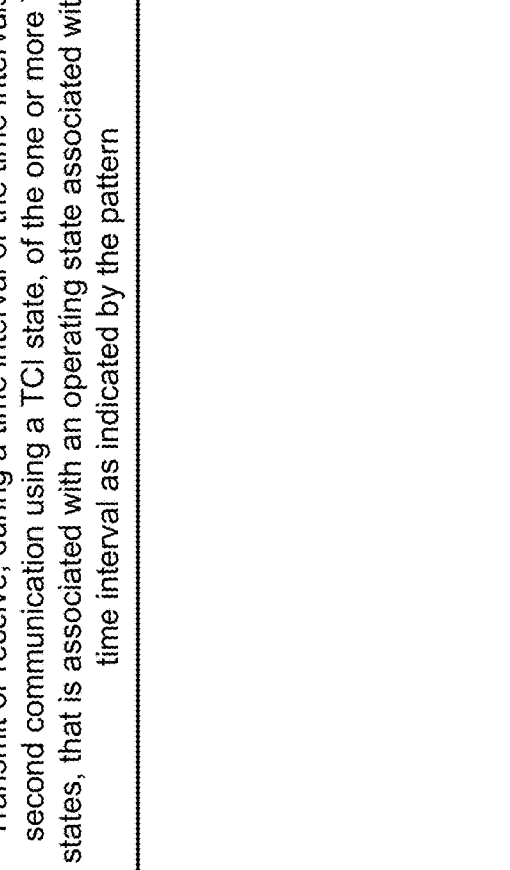

1510 — Transmit a first communication that activates one or more transmission configuration indicator (TCI) states associated with respective operating states that are associated with a pattern indicating time intervals associated with the respective operating states 1520 — Transmit or receive, during a time interval of the time intervals, a second communication using a TCI state, of the one or more TCI states, that is associated with an operating state associated with the time interval as indicated by the pattern

TRANSMISSION CONFIGURATION INDICATOR STATES FOR DIFFERENT OPERATING STATES

FIELD OF THE DISCLOSURE

Aspects of the present disclosure generally relate to wireless communication and specifically, to techniques and apparatuses associated with transmission configuration indicator (TCI) states for different operating states.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, a network node may operate using different operating states. In the different operating states, the network node may use different antennas, different antenna panels, different antenna configurations, and/or different transmission reception points (TRPs) to communicate with one or more user equipments (UEs). For example, an operating state may include an energy saving mode. In the energy saving mode, the network node may operate using an antenna configuration that uses less antennas (for example, to save energy). In another operating state, the network node may operate using an antenna configuration that uses more antennas (for example, for improved communication performance). Therefore, in the energy saving mode, the network node may be unable to communicate with a UE using one or antennas and/or antenna panels (for example, that are inactive during the energy saving mode, but would otherwise be available in the other operating state). As another example, an operating state may be associated with an operational status of a TRP associated with the network node. For example, a TRP may be dormant (for example, inactive) to save energy, such as when there are no UEs within a coverage area of the TRP. Therefore, in such operating states, the network node may be unable to communicate with a UE via a dormant TRP.

As another example, an operating state may include a full-duplex mode. For example, the network node may operate in a full-duplex mode (for example, may transmit and receive communications at the same time). To improve spatial isolation of antennas and/or TRPs used for respective communication directions, the network node may use a first antenna and/or a first TRP for downlink signals and a second antenna and/or a second TRP for uplink signals when operating in the full-duplex mode. For example, improving a spatial isolation of the first antenna and/or the first TRP from the second antenna and/or the second TRP may reduce self-interference associated with full-duplex operations. Therefore, the first antenna and/or the first TRP of the network node may be unavailable for uplink signals and the second antenna and/or the second TRP of the network node may be unavailable for downlink signals when the network node is operating in the full-duplex mode.

Therefore, when a network node is operating in certain operating states, a TRP or antenna of the network node may be available (for example, for uplink communications and/or for downlink communications), but when the network node is operating in other operating states, the TRP or the antenna of the network node may be unavailable (for example, for uplink communications and/or for downlink communications). As a result, the network node may switch a transmission configuration indicator (TCI) state used by a UE when the network node switches to a given operating state (for example, if a previous TCI state used by the UE is associated with a TRP or antenna that is unavailable when the network node is operating in the given operating state). This increases a signaling overhead associated with the network node transmitting beam indications to switch the TCI state of a UE when the network node switches the operating state. Additionally, in some cases, the UE may be unable to switch to the TCI state indicated by the network node before a next scheduled communication when the network node switches the operating state near the scheduled communication (for example, switching the TCI state may be associated with some processing time at the UE), which may result in the UE being unable to transmit or receive the scheduled communication.

SUMMARY

Some aspects described herein relate to a user equipment (UE) for wireless communication. The UE may include at least one memory and at least one processor communicatively coupled with the at least one memory. The at least one processor may be operable to cause the UE to receive a first communication that activates one or more transmission configuration indicator (TCI) states associated with respective operating states that are associated with a pattern indicating time intervals associated with the respective operating states. The at least one processor may be operable to cause the UE to transmit or receive, during a time interval of the time intervals, a second communication using a TCI state, of the one or more TCI states, that is associated with an operating state associated with the time interval as indicated by the pattern.

Some aspects described herein relate to a network node for wireless communication. The network node may include at least one memory and at least one processor communicatively coupled with the at least one memory. The at least one processor may be operable to cause the network node to transmit a first communication that activates one or more TCI states associated with respective operating states that are associated with a pattern indicating time intervals associated with the respective operating states. The at least one processor may be operable to cause the network node to transmit or receive, during a time interval of the time intervals, a second communication using a TCI state, of the one or more TCI states, that is associated with an operating state associated with the time interval as indicated by the pattern.

Some aspects described herein relate to a method of wireless communication performed by a UE. The method may include receiving a first communication that activates one or more TCI states associated with respective operating states that are associated with a pattern indicating time intervals associated with the respective operating states. The method may include transmitting or receiving, during a time interval of the time intervals, a second communication using a TCI state, of the one or more TCI states, that is associated with an operating state associated with the time interval as indicated by the pattern.

Some aspects described herein relate to a method of wireless communication performed by a network node. The method may include transmitting a first communication that activates one or more TCI states associated with respective operating states that are associated with a pattern indicating time intervals associated with the respective operating states. The method may include transmitting or receiving, during a time interval of the time intervals, a second communication using a TCI state, of the one or more TCI states, that is associated with an operating state associated with the time interval as indicated by the pattern.

Some aspects described herein relate to a non-transitory computer-readable medium that stores a set of instructions for wireless communication by a UE. The set of instructions, when executed by one or more processors of the UE, may cause the UE to receive a first communication that activates one or more TCI states associated with respective operating states that are associated with a pattern indicating time intervals associated with the respective operating states. The set of instructions, when executed by one or more processors of the UE, may cause the UE to transmit or receive, during a time interval of the time intervals, a second communication using a TCI state, of the one or more TCI states, that is associated with an operating state associated with the time interval as indicated by the pattern.

Some aspects described herein relate to a non-transitory computer-readable medium that stores a set of instructions for wireless communication by a network node. The set of instructions, when executed by one or more processors of the network node, may cause the network node to transmit a first communication that activates one or more TCI states associated with respective operating states that are associated with a pattern indicating time intervals associated with the respective operating states. The set of instructions, when executed by one or more processors of the network node, may cause the network node to transmit or receive, during a time interval of the time intervals, a second communication using a TCI state, of the one or more TCI states, that is associated with an operating state associated with the time interval as indicated by the pattern.

Some aspects described herein relate to an apparatus for wireless communication. The apparatus may include means for receiving a first communication that activates one or more TCI states associated with respective operating states that are associated with a pattern indicating time intervals associated with the respective operating states. The apparatus may include means for transmitting or means for receiving, during a time interval of the time intervals, a second communication using a TCI state, of the one or more TCI states, that is associated with an operating state associated with the time interval as indicated by the pattern.

Some aspects described herein relate to an apparatus for wireless communication. The apparatus may include means for transmitting a first communication that activates one or more TCI states associated with respective operating states that are associated with a pattern indicating time intervals associated with the respective operating states. The apparatus may include means for transmitting or means for receiving, during a time interval of the time intervals, a second communication using a TCI state, of the one or more TCI states, that is associated with an operating state associated with the time interval as indicated by the pattern.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a diagram illustrating examples of full-duplex communication, in accordance with the present disclosure.

FIG. 12 is diagram of an example associated with joint TCI state indications for multiple operating states of a network node in accordance with the present disclosure.

FIG. 13 is diagram of an example associated with separate TCI state indications for multiple operating states of a network node in accordance with the present disclosure.

FIG. 14 is a flowchart illustrating an example process performed, for example, by a UE that supports TCI states for different operating states in accordance with the present disclosure.

FIG. 15 is a flowchart illustrating an example process performed, for example, by a network node that supports TCI states for different operating states in accordance with the present disclosure.

DETAILED DESCRIPTION

Figure 1:
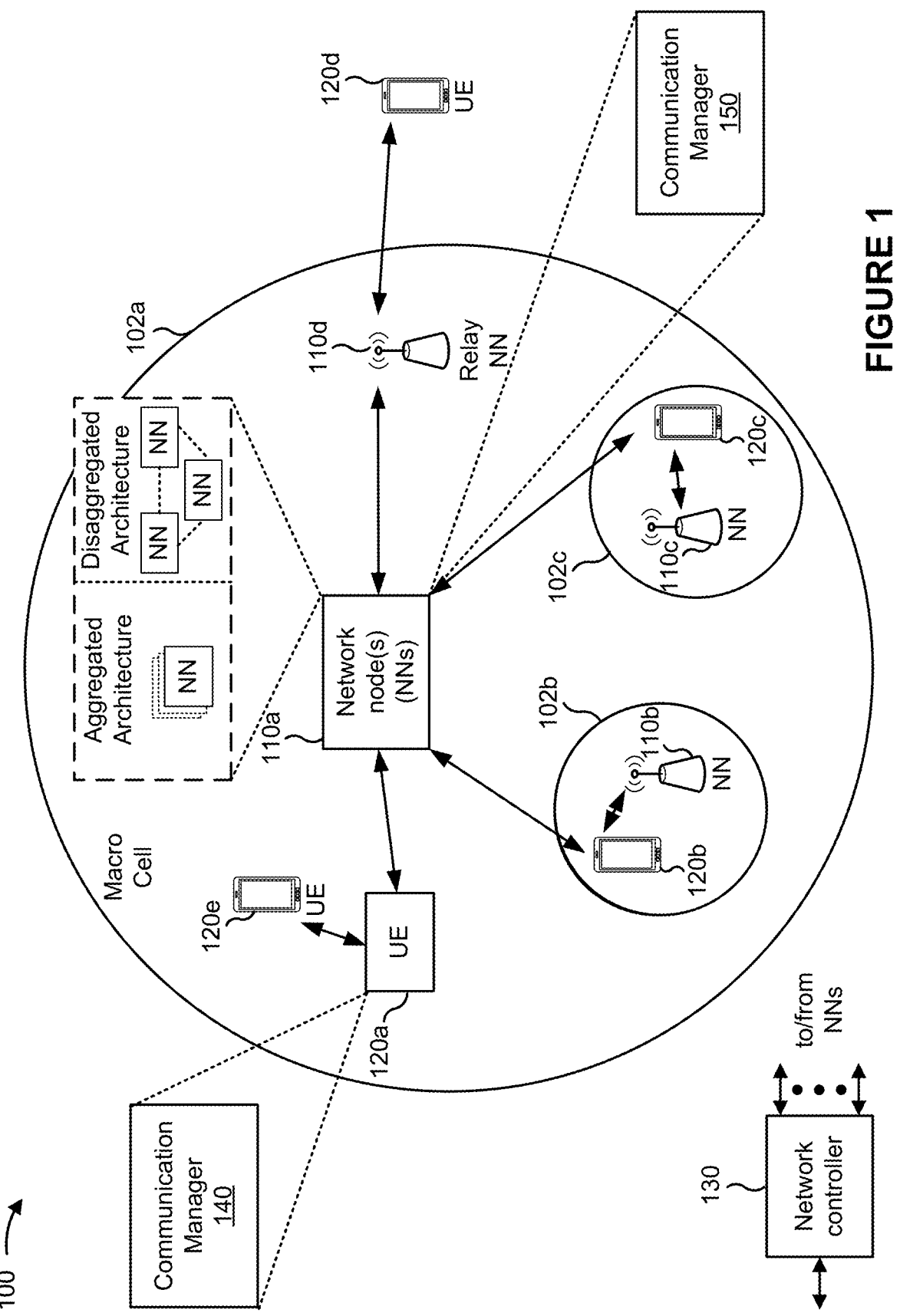
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to transmission configuration indicator (TCI) states associated with different operating states of a network node. Some aspects more specifically relate to a TCI state (for example, a unified TCI state) that includes an indication of an associated operating state of the network node. In some aspects, a UE may use or apply the TCI state (for example, for a communication direction and/or signal associated with the TCI state) during a time interval (for example, a slot or symbol) that is associated with the operating state. For example, the UE may receive an indication that a time interval is associated with the operating state of the network node. In some aspects, the time interval being associated with the operating state may be in accordance with a pattern (for example, a pattern of operating states over time indicated by the network node). The UE may identify an operating state associated with a current time interval and may apply a corresponding TCI state that is associated with the operating state.

In some aspects, the pattern may be associated with a time division duplexing (TDD) configuration indicating a slot pattern. For example, the slot pattern may indicate whether a slot is a downlink slot, an uplink slot, or a full-duplex slot. The UE may receive an indication that a TCI state (for example, a unified TCI state) is associated with a full-duplex mode of the network node. Therefore, during full-duplex slots, the UE may communicate (for example, transmit or receive) using the TCI state that is associated with the full-duplex mode. During other slots (for example, uplink slots or downlink slots), the UE may communicate (for example, transmit or receive) using another indicated or activated TCI state (for example, and may not use the TCI state that is associated with the full-duplex mode), such as a TCI state associated with a non-full-duplex mode.

Particular aspects of the subject matter described in this disclosure can be implemented to realize one or more of the following potential advantages. In some examples, the described techniques can be used to reduce a signaling overhead associated with switching a TCI state used by the UE when the network node changes operating states. In some examples, an amount of time associated with the UE switching to the TCI state associated with a given operating state is reduced because a processing time associated with receiving a beam indication (for example, receiving an indication of the TCI state) may be reduced or eliminated. Configuring a TCI state to be associated with a given duplex mode (for example, full-duplex or half-duplex) may reduce self-interference at the network node by enabling the network node to use antennas and/or transmission reception points (TRPs) for respective communication directions with improved spatial isolation, while also reducing a signaling overhead associated with the network node indicating to the UE to use the TCI state that enables the spatial isolation.

Additionally, configuring a TCI state to be associated with an energy saving mode of the network node (for example, associated with an inactive antenna or TRP) may result in improved energy savings at the network node, while also reducing a signaling overhead associated with the network node indicating to the UE to use the TCI state that is not associated with the inactive antenna or TRP.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a TRP, a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a first communication that activates one or more TCI states associated with respective operating states that are associated with a pattern indicating time intervals associated with the respective operating states; and transmit or receive, during a time interval of the time intervals, a second communication using a TCI state, of the one or more TCI states, that is associated with an operating state associated with the time interval as indicated by the pattern. Additionally or alternatively, the communication manager 140 may perform one or more other operations described herein.

In some aspects, the network node 110 may include a communication manager 150. As described in more detail elsewhere herein, the communication manager 150 may transmit a first communication that activates one or more TCI states associated with respective operating states that are associated with a pattern indicating time intervals associated with the respective operating states; and transmit or receive, during a time interval of the time intervals, a second communication using a TCI state, of the one or more TCI states, that is associated with an operating state associated with the time interval as indicated by the pattern. Additionally or alternatively, the communication manager 150 may perform one or more other operations described herein.

Figure 2:
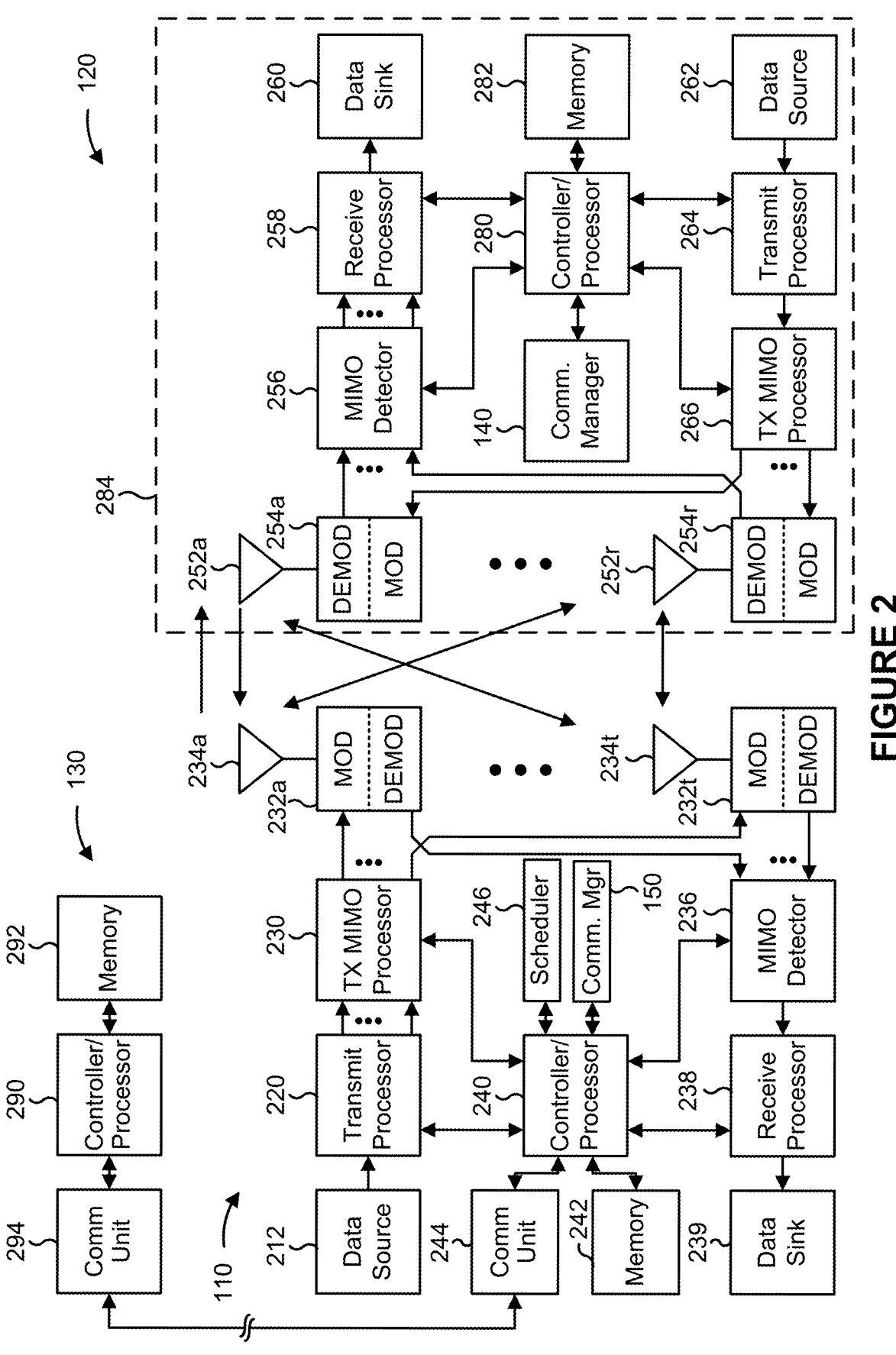
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with TCI states for different operating states, as described in more detail elsewhere herein. For example, the controller/processor 240 of the network node 110, the controller/processor 280 of the UE 120, or any other component(s) of FIG. 2 may perform or direct operations of, for example, process 1400 of FIG. 14, process 1500 of FIG. 15, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1400 of FIG. 14, process 1500 of FIG. 15, or other processes as described herein. In some examples, executing instructions may include running the instructions, converting the instructions, compiling the instructions, or interpreting the instructions, among other examples.

In some aspects, the UE 120 includes means for receiving a first communication that activates one or more TCI states associated with respective operating states that are associated with a pattern indicating time intervals associated with the respective operating states; and/or means for transmitting or means for receiving, during a time interval of the time intervals, a second communication using a TCI state, of the one or more TCI states, that is associated with an operating state associated with the time interval as indicated by the pattern. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a first communication that activates one or more TCI states associated with respective operating states that are associated with a pattern indicating time intervals associated with the respective operating states; and/or means for transmitting or means for receiving, during a time interval of the time intervals, a second communication using a TCI state, of the one or more TCI states, that is associated with an operating state associated with the time interval as indicated by the pattern. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (for example, triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (for example, from the UE 120 to the network node 110) or receiving the communication (or information derived from reception of the communication) via one or more other network nodes or devices.

Figure 3:
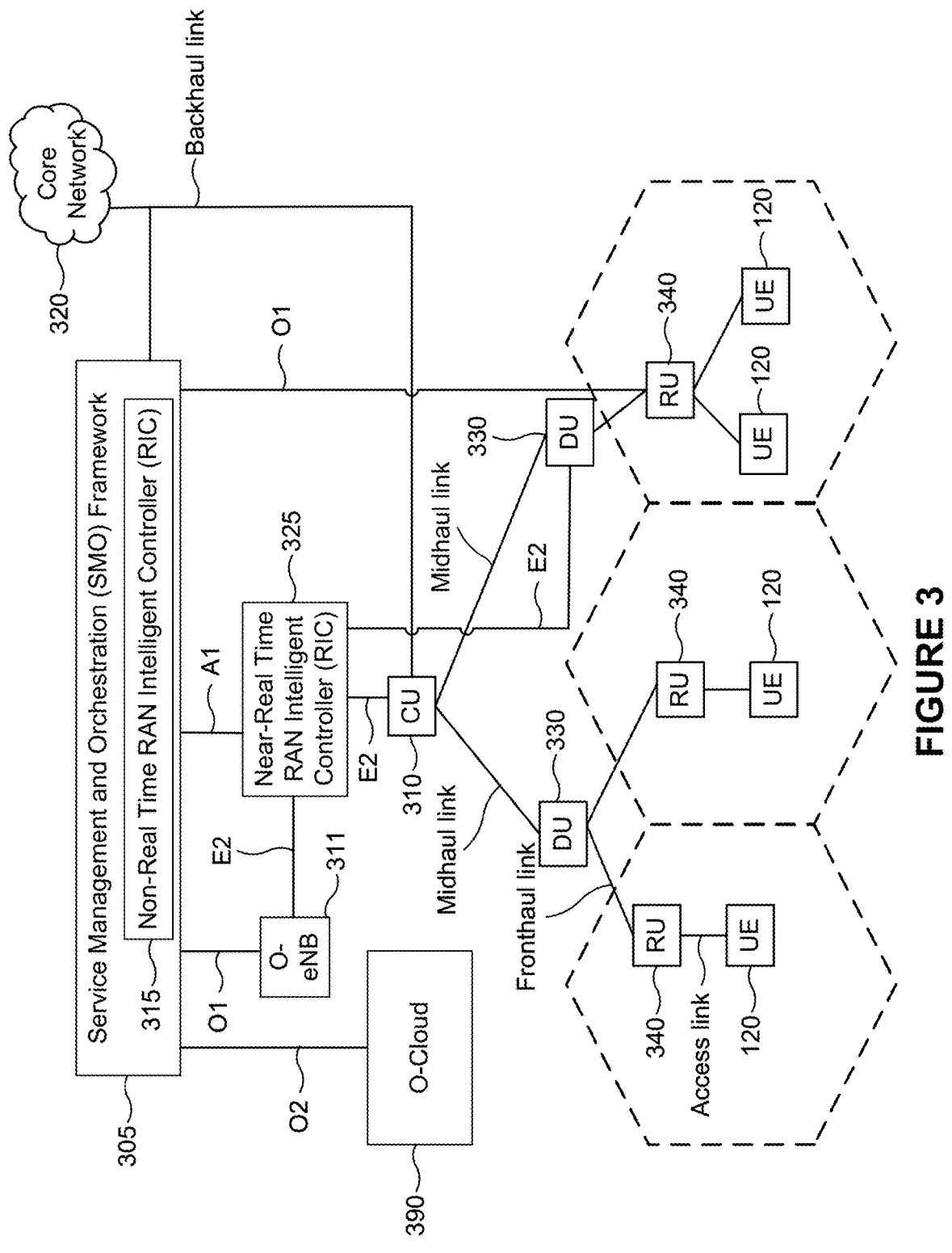
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

In some examples, an access node may include an access node controller. The access node controller may be a CU of a distributed RAN. In some examples, a backhaul interface to a core network may terminate at the access node controller. The core network may include a 5G control plane component and a 5G user plane component (for example, a 5G gateway that includes both the 5G control plane component and the 5G user plane component), and a backhaul interface for one or both of the 5G control plane and the 5G user plane may terminate at the access node controller. Additionally or alternatively, a backhaul interface to one or more neighbor access nodes (for example, another access node) may terminate at the access node controller.

The access node controller may be associated with or may communicate with one or more TRPs (for example, via an F1 Control (F1-C) interface or an F1 User (F1-U) interface). In some cases, a TRP may be referred to as a cell, a panel (for example, an antenna panel), an antenna array, or an array, among other examples. Each TRP may be a DU or an RU of the distributed RAN. A TRP may be connected to a single access node controller or to multiple access node controllers. In some examples, a TRP may correspond to a base station described above in connection with FIG. 1, 2, or 3. For example, different TRPs may be included in different respective base stations. Additionally or alternatively, multiple TRPs may be included in a single base station. In some aspects, a disaggregated base station may include a CU (for example, access node controller) or one or more DUs (for example, one or more TRPs). In some examples, a functional split of base station functionality between an access node controller (for example, a CU), and a TRP (for example, a DU or an RU) may be defined, such as by the 3GPP. For example, a PDCP layer, an RLC layer, or a MAC layer may be configured to terminate at the access node controller or at a TRP.

In some examples, multiple TRPs may transmit communications (for example, the same communication or different communications) in a same transmission time interval (TTI) (for example, a slot, a mini-slot, a subframe, or a symbol) or in different TTIs using different quasi co-location (QCL) relationships (for example, different spatial parameters, different TCI states, different precoding parameters, or different beamforming parameters). In some aspects, a TCI state may be used to indicate one or more QCL relationships. Each TRP may be configured to individually (for example, using dynamic selection) or jointly (for example, using joint transmission with one or more other TRPs) serve traffic to a UE 120.

Figure 4:
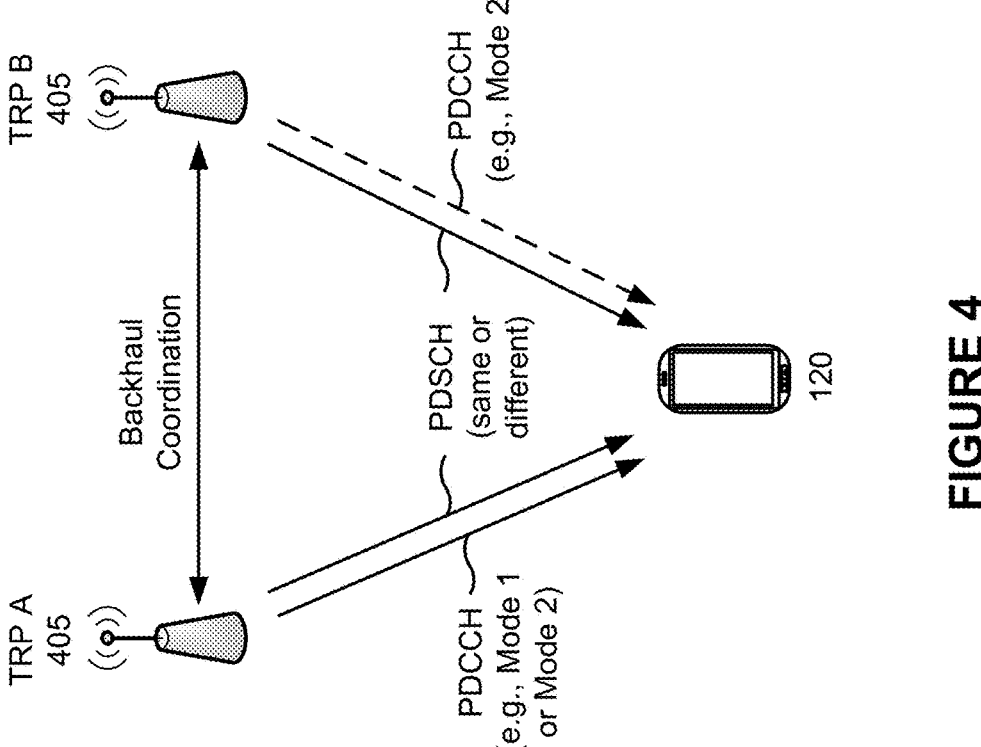
FIG. 4 is a diagram illustrating an example of multi-transmission reception point communication, in accordance with the present disclosure.

FIG. 4 is a diagram illustrating an example of multi-TRP communication 400, in accordance with the present disclosure. Multi-TRP communication 400 may sometimes referred to as multi-panel communication. As shown in FIG. 4, multiple TRPs 405 may communicate with the same UE 120.

The multiple TRPs 405 (shown as TRP A and TRP B) may communicate with the same UE 120 in a coordinated manner (for example, using coordinated multipoint transmissions) to improve reliability or increase throughput. The TRPs 405 may coordinate such communications via an interface between the TRPs 405 (for example, a backhaul interface or an access node controller). The interface may have a smaller delay or higher capacity when the TRPs 405 are co-located at the same network node 110 (for example, when the TRPs 405 are different antenna arrays or panels of the same network node 110), and may have a larger delay or lower capacity (as compared to co-location) when the TRPs 405 are located at different network nodes 110. The different TRPs 405 may communicate with the UE 120 using different QCL relationships (for example, different TCI states), different DMRS ports, or different layers (for example, of a multi-layer communication).

In a first multi-TRP transmission mode (for example, Mode 1), a single physical downlink control channel (PDCCH) may be used to schedule data communications for a single physical downlink shared channel (PDSCH) or a single physical uplink shared channel (PUSCH). In such examples, multiple TRPs 405 (for example, TRP A and TRP B) may transmit communications to the UE 120 on the same PDSCH or PUSCH. For example, a communication may be transmitted using a single codeword with different spatial layers for different TRPs 405 (for example, where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (for example, using different sets of layers). In either case, different TRPs 405 may use different QCL relationships (for example, different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some examples, a TCI state in downlink control information (DCI) (for example, transmitted on the PDCCH, such as DCI format 1_0 or DCI format 1_1) may indicate the first QCL relationship (for example, by indicating a first TCI state) and the second QCL relationship (for example, by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (for example, Mode 1). The Mode 1 described above may be referred to as a single DCI (sDCI) multi-TRP mode.

In a second multi-TRP transmission mode (for example, Mode 2), multiple PDCCHs may be used to schedule downlink or uplink data communications for multiple corresponding PDSCHs or multiple corresponding PUSCHs (for example, one PDCCH for each PDSCH or PUSCH). In such examples, a first PDCCH may schedule a first codeword to be transmitted by a first TRP 405, and a second PDCCH may schedule a second codeword to be transmitted by a second TRP 405. Furthermore, first DCI (for example, transmitted by the first TRP 405) may schedule a first PDSCH communication associated with a first set of DMRS ports with a first QCL relationship (for example, indicated by a first TCI state) for the first TRP 405, and second DCI (for example, transmitted by the second TRP 405) may schedule a second PDSCH communication associated with a second set of DMRS ports with a second QCL relationship (for example, indicated by a second TCI state) for the second TRP 405. In such examples, DCI (for example, having DCI format 1_0 or DCI format 1_1) may indicate a corresponding TCI state for a TRP 405 corresponding to the DCI. The TCI field of a DCI indicates the corresponding TCI state (for example, the TCI field of the first DCI indicates the first TCI state and the TCI field of the second DCI indicates the second TCI state). The Mode 2 described above may be referred to as a multiple DCI (mDCI) multi-TRP mode, For example, in some wireless communications systems, a UE may be configured with multi-DCI based multi-TRP operation. Multi-DCI based multi-TRP operation configuration allows the UE to concurrently communicate via multiple TRPs. For example, a UE may receive, from a first TRP, first DCI in a first PDCCH, where the first DCI schedules a first PDSCH or PUSCH to be transmitted by the first TRP. Similarly, the UE may receive, from a second TRP, second DCI in a second PDCCH, where the second DCI schedules a second PDSCH or PUSCH to be transmitted by the second TRP. The first and second PDSCHs or PUSCHs can be non-overlapping, partially overlapping, or fully overlapping. In the case of a partial overlapping or a full overlapping, DMRS symbols can be aligned and different code division multiplexing (CDM) groups can be used in association with communication of the first and second PDSCHs or PUSCHs. In association with monitoring DCIs transmitted from different TRPs, the UE may monitor PDCCH candidates in PDCCH monitoring occasions in different control resource sets (CORESETs), as configured by the network. In the case of multi-DCI based multi-TRP operation described above, differentiation of TRPs at the UE-side may be on the basis of CORESET groups. For example, each CORESET may be associated with a higher layer (for example, an RRC layer) index, meaning that CORESETs can be grouped based on, in response to, or otherwise associated with higher layer indices signaled on a per CORESET basis. These higher layer indices may be used to group CORESETs into multiple groups. For example, CORESETs with a higher layer index of 0 are included in first CORESET group, and CORESETs with a higher layer index of 1 are included in a second CORESET group. Here, the first CORESET group and the second CORESET group each correspond to a different TRP. In other words, CORESETs in a given group are associated with a particular TRP.

In some examples, for inter-cell multi-TRP operation, one additional cell may be activated for a UE (for example, in addition to a serving cell) for a given component carrier (CC). For example, for a CC, a physical cell identifier (PCI) for the serving cell may be activated and one additional PCI (for example, in addition to the serving cell PCI) may be supported by the UE for the CC. The additional PCI (for example, the additional cell) may be associated with one or more TCI states that are activated for the CC (for example, for a PDSCH, PUSCH, physical uplink control channel (PUCCH) or PDCCH associated with the CC). For example, for the CC, a first PCI may be associated with one or more activated TCI states for the PDSCH/PDCCH/PUSCH/ PUCCH of the CC and a first CORESET pool index (for example, a first CORESETPoolIndex). A second PCI may be associated with one or more activated TCI states for the PDSCH/PDCCH/PUSCH/PUCCH of the CC and a second CORESET pool index (for example, a second CORESET-PoolIndex) (for example, in a multi-DCI multi-TRP operation).

Figure 5B:
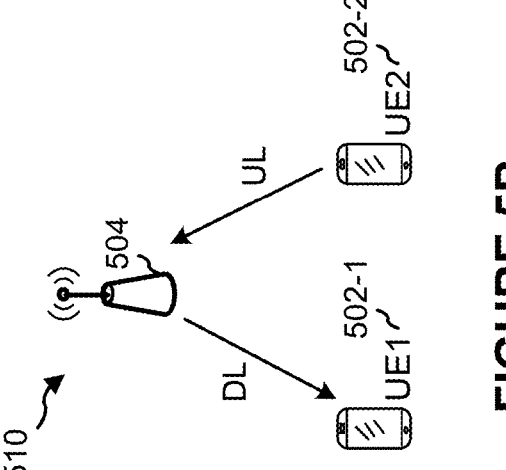
FIGS. 5A-5C are diagrams illustrating examples of full-duplex communication in accordance with the present disclosure.
Figure 5C:
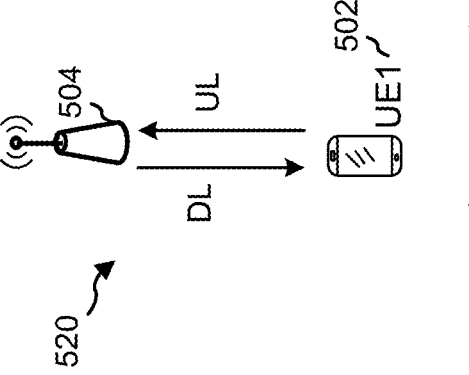
Figure 5A:
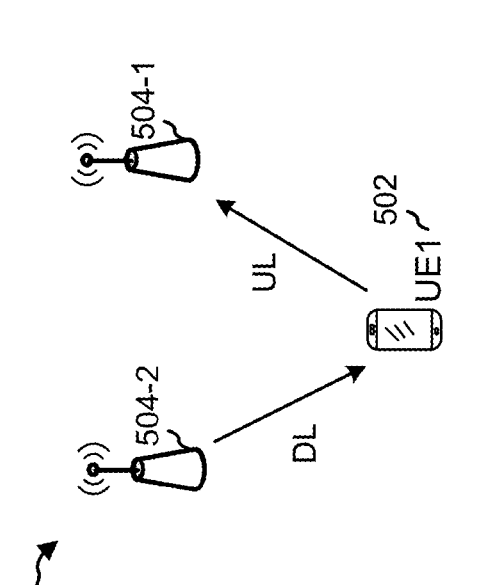

FIGS. 5A-5C are diagrams illustrating examples of full-duplex communication in accordance with the present disclosure. A first full-duplex scenario 500 depicted in FIG. 5A includes a UE1 502 and two network nodes (for example, network entities or TRPs) 504-1, 504-2, where the UE1 502 is sending uplink transmissions to network node 504-1 and is receiving downlink transmissions from network node 504-2. In the first full-duplex scenario 500 of FIG. 5A, full-duplex is enabled for the UE1 502, but not for the network nodes 504-1, 504-2. A second full-duplex scenario 510 depicted in FIG. 5B includes two UEs, shown as UE1 502-1 and UE2 502-2, and a network node 504, where the UE1 502-1 is receiving a downlink transmission from the network node 504 and the UE2 502-2 is transmitting an uplink transmission to the network node 504. In the second full-duplex scenario 510, full-duplex is enabled for the network node 504, but not for UE1 502-1 and UE2 502-2.

A third full-duplex scenario 520 is depicted in FIG. 5C that includes a UE1 502 and a network node 504, where the UE1 502 is receiving a downlink transmission from the network node 504 and the UE1 502 is transmitting an uplink transmission to the network node 504. In the third full-duplex scenario 520, full-duplex is enabled for both the UE1 502 and the network node 504.

FIG. 6 is a diagram illustrating examples of full-duplex communication 600, in accordance with the present disclosure. A UE may operate in an in-band full-duplex mode. In the in-band full-duplex mode, the UE may transmit and receive on a same time and frequency resource. An uplink and a downlink may share the same time and frequency resource. For example, in a first full-duplex communication 602, a time and frequency resource for the uplink may fully overlap with a time and frequency resource for the downlink. As another example, in a second full-duplex communication 604, a time and frequency resource for the uplink may partially overlap with a time and frequency resource for the downlink.

A UE may operate in a subband full-duplex (SBFD) mode. The SBFD mode may also be referred to as a subband frequency division duplex mode or a flexible duplex mode. In the SBFD mode, the UE may transmit and receive at a same time, but the UE may transmit and receive on different frequency domain resources. For example, in a third full-duplex communication 606, a downlink resource may be separated from an uplink resource by a guard band in a frequency domain. In some examples, SBFD may be associated with a network node that is operating in a full-duplex mode (for example, transmitting and receiving at the same time on different frequency domain resources). In such examples, UEs communicating with the network node may be operating in a half-duplex mode.

In some examples, a slot configuration may include a combination of downlink slots, uplink slots, or full-duplex slots (for example, a SBFD slot or an in-band full-duplex slot). A full-duplex slot may include one or more downlink time/frequency resources and one or more uplink time/frequency resources. A downlink time/frequency resource in the full-duplex slot may be separated (for example, in time or frequency) from an uplink time/frequency resource in the full-duplex slot by a gap, which may function to reduce self-interference and improve latency and uplink coverage. For example, the gap may be a frequency offset or a frequency gap between downlink time/frequency resources and uplink time/frequency resources in the same full-duplex slot. For example, a network node may be operating in a full-duplex mode (for example, transmitting and receiving at the same time on the same or different frequency domain resources). The network node may schedule a first UE to receive a downlink communication in a full-duplex slot. The network node may schedule a second UE to transmit an uplink communication in the same full-duplex slot.

Figure 7:
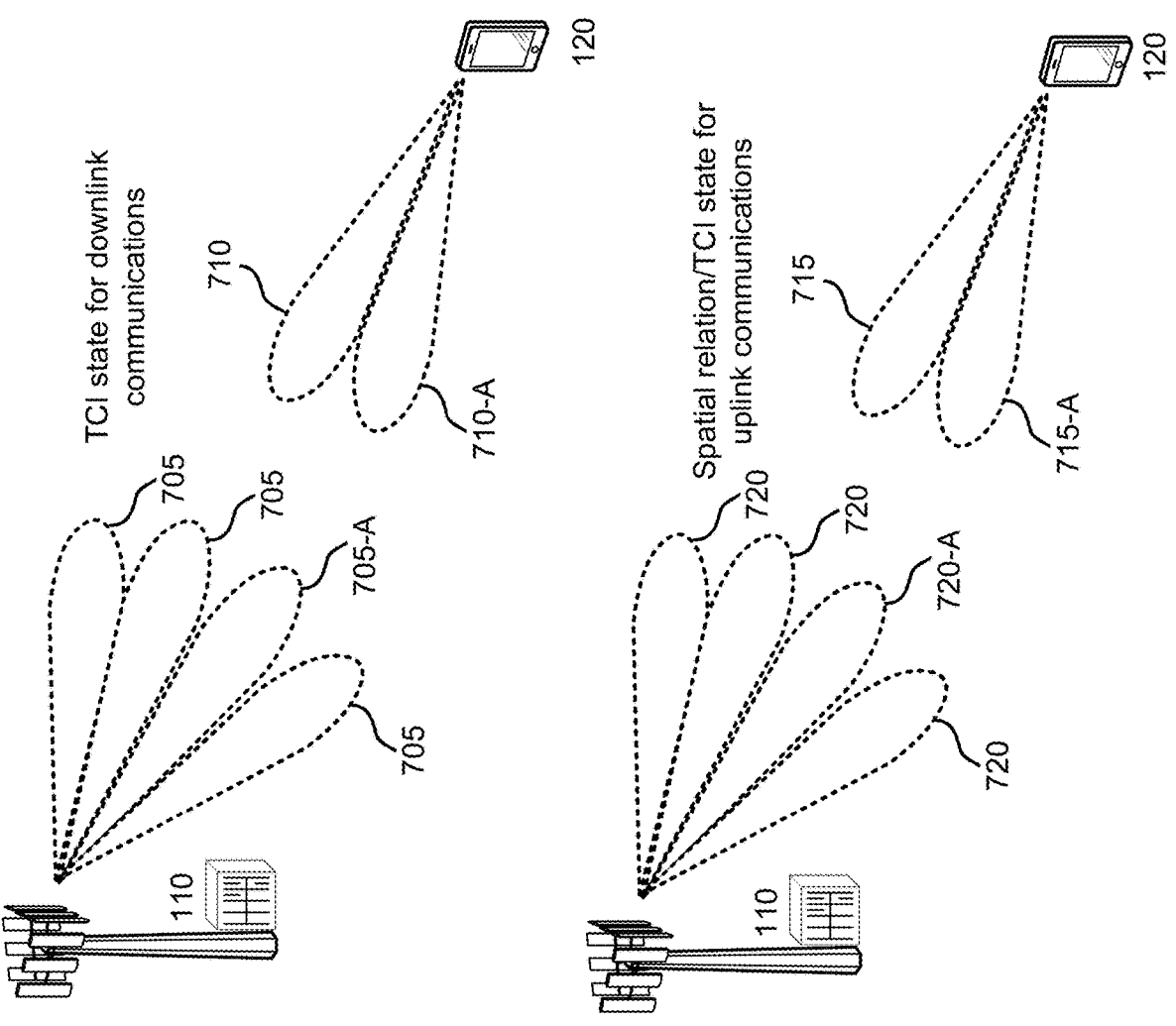
FIG. 7 is a diagram illustrating an example of using beams for communications between a network node and a UE, in accordance with the present disclosure.

FIG. 7 is a diagram illustrating an example of using beams for communications between a network node and a UE, in accordance with the present disclosure. As shown in FIG. 7, a network node 110 and a UE 120 may communicate with one another using beamformed signals.

The network node 110 may transmit to UEs 120 located within a coverage area of the network node 110. The network node 110 and the UE 120 may be configured for beamformed communications, where the network node 110 may transmit in the direction of the UE 120 using a directional NN transmit beam (for example, a base station (BS) transmit beam), and the UE 120 may receive the transmission using a directional UE receive beam. Each NN transmit beam may have an associated beam identifier (ID), beam direction, or beam symbols, among other examples. The network node 110 may transmit downlink communications via one or more NN transmit beams 705.

The UE 120 may attempt to receive downlink transmissions via one or more UE receive beams 710, which may be configured using different beamforming parameters at receive circuitry of the UE 120. The UE 120 may identify a particular NN transmit beam 705, shown as NN transmit beam 705-A, and a particular UE receive beam 710, shown as UE receive beam 710-A, that provide relatively favorable performance (for example, that have a best channel quality of the different measured combinations of NN transmit beams 705 and UE receive beams 710). In some examples, the UE 120 may transmit an indication of which NN transmit beam 705 is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam 705-A and the UE receive beam 710-A), which may be further refined and maintained in accordance with one or more established beam refinement procedures.

A downlink beam, such as an NN transmit beam 705 or a UE receive beam 710, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each NN transmit beam 705 may be associated with a synchronization signal block (SSB), and the UE 120 may indicate a preferred NN transmit beam 705 by transmitting uplink transmissions in resources of the SSB that are associated with the preferred NN transmit beam 705. A particular SSB may have an associated TCI state (for example, for an antenna port or for beamforming). The network node 110 may, in some examples, indicate a downlink NN transmit beam 705 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 710 at the UE 120. Thus, the UE 120 may select a corresponding UE receive beam 710 from a set of BPLs based at least in part on the network node 110 indicating an NN transmit beam 705 via a TCI indication. For example, a TCI state information element may indicate a TCI state identification (such as a tci-StateID), a QCL type (such as a qcl-Type1, qcl-Type2, qcl-TypeA, a qcl-TypeB, a qcl-TypeC, or a qcl-TypeD), a cell identification (such as a ServCellIndex), a bandwidth part identification (such as a bwp-Id), or a reference signal identification (such as an NZP-CSI-RS-ResourceId or an SSB-Index), among other examples.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a PDSCH. The set of activated TCI states for downlink control channel communications may correspond to beams that the network node 110 may use for downlink transmission on a PDCCH or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams 715.

The network node 110 may receive uplink transmissions via one or more NN receive beams 720 (for example, BS receive beams). The network node 110 may identify a particular UE transmit beam 715, shown as UE transmit beam 715-A, and a particular NN receive beam 720, shown as NN receive beam 720-A, that provide relatively favorable performance (for example, that have a best channel quality of the different measured combinations of UE transmit beams 715 and NN receive beams 720). In some examples, the network node 110 may transmit an indication of which UE transmit beam 715 is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam 715-A and the NN receive beam 720-A), which may be further refined and maintained in accordance with one or more established beam refinement procedures. An uplink beam, such as a UE transmit beam 715 or an NN receive beam 720, may be associated with a spatial relation. A spatial relation may indicate a directionality or a characteristic of the uplink beam, similar to one or more QCL properties, as described above.

In a unified TCI framework, the network (for example, the network node 110) may support common TCI state ID update and activation to provide common QCL information or common uplink transmission spatial filter or filters across a set of configured CCs. This type of beam indication may apply to intra-band carrier aggregation (CA), as well as to joint downlink and uplink (DL/UL) and separate downlink and uplink beam indications. The common TCI state ID may imply that one reference signal (RS) determined in accordance with the TCI state(s) indicated by a common TCI state ID is used to provide QCL Type-D indication and to determine UL transmission spatial filters across the set of configured CCs. In a unified TCI state framework, a TCI state may be provided for downlink (DL) beams and uplink (UL) beams. In some cases, a joint uplink and downlink TCI state may be defined that indicates a common beam for both uplink communications and downlink communications. In some examples, separate TCI states may be defined for uplink communications and downlink communications, such as one or more uplink TCI states and one or more downlink TCI states.

Some networks may use different beam indication types for indicating one or more beams to use for communication via a set of channels. A beam indication may be, or include, a TCI state information element, a beam ID, spatial relation information, a TCI state ID, a closed loop index, a panel ID, a TRP ID, and/or a sounding reference signal (SRS) set ID, among other examples. In some examples, types of beam indication types may include a beam indication that indicates to use a common beam for multiple channels or resources for reference signals, or beam indication types that include a single beam indication that indicates to use a beam for a single channel or a resource for reference signals. As used herein, a unified TCI state indication may refer to a TCI state indication using the unified TCI framework.

For example, a unified TCI state indication may include an indication of a TCI state that may be applied to multiple channels and/or reference signals. For example, in some cases, a TCI state may be used for a downlink beam indication, and a spatial relation may be used for an uplink beam indication. Such beam indications may be referred to herein as "non-unified beam indications." Non-unified beam indications may be applied to one channel for one communication scheduled in that channel.

In some examples, the network node 110 and the UE 120 may use a unified TCI framework for both downlink and uplink beam indications. In the unified TCI framework, TCI state indications may be used to indicate a joint downlink and uplink TCI state or to indicate separate downlink and uplink TCI states. Such a TCI state indication that may be used to indicate a joint downlink and uplink beam, a separate downlink beam, or a separate uplink beam is referred to herein as a "unified TCI state indication." A unified TCI state indication (for example, a joint downlink and uplink TCI state indication and/or separate downlink and uplink TCI state indications) may be applied to multiple channels. For example, the unified TCI state indication of a joint uplink and downlink TCI state may be used to indicate a beam direction for one or more downlink channels (for example, PDSCH and/or PDCCH) or reference signals (for example, CSI-RS) and for one or more uplink channels (for example, PUSCH and/or PUCCH) or reference signals (for example, an SRS). The unified TCI state indication of a separate downlink TCI state may be used to indicate a beam direction for multiple downlink channels (for example, PDSCH and PDCCH) or reference signals (for example, CSI-RS). The unified TCI state indication of a separate uplink TCI state may be used to indicate a beam direction to be used for multiple uplink channels (for example, PUSCH and PUCCH) or reference signals (for example, SRS). In some examples, the unified TCI state indication may be "sticky," such that the indicated beam direction will be used for the channels and/or reference signals to which the TCI state indication applies until a further indication is received.

In some examples, there may be two TCI state indication modes in the unified TCI state framework. A first mode may be a separate downlink and uplink TCI state indication mode, in which separate downlink and uplink TCI states are used to indicate downlink and uplink beam directions for the UE. For example, the separate downlink and uplink TCI state indication mode may be used when the UE is having maximum permissible exposure (MPE) issues to indicate different beam directions, for the UE, for an uplink beam (for example, a UE Tx beam) and a downlink beam (for example, a UE Rx beam). A second mode may be a joint downlink and uplink TCI state indication mode, in which a TCI state indication is used to indicate, to the UE, a joint uplink and downlink beam direction. For example, the joint downlink and uplink TCI state indication mode may be used when the UE has channel correspondence between downlink and uplink channels (which may be assumed in some examples), and the same beam direction can be used for an uplink beam (for example, a UE Tx beam) and a downlink beam (for example, a UE Rx beam).

In some examples, in the unified TCI state framework, downlink TCI states, uplink TCI states, and/or joint downlink and uplink TCI states may be configured for a UE via RRC signaling from a network node. A MAC control element (MAC-CE), transmitted from the network node to the UE, may activate a quantity of the RRC-configured TCI states and indicate a mapping of TCI field codepoints. In some examples, one TCI field codepoint may represent a joint downlink and uplink TCI state, and the TCI field codepoint may be used for a joint downlink and uplink beam indication. In some examples, one TCI field may represent a pair of TCI states including a downlink TCI state and an uplink TCI state, and the TCI field codepoint may be used for a separate downlink and uplink beam indication. In some examples, one TCI field codepoint may represent only a downlink TCI state, and the TCI field codepoint may be used for a downlink only beam indication. In some examples, one TCI field codepoint may represent only an uplink TCI state, and the TCI field codepoint may be used for an uplink only beam indication. If the MAC-CE indicates a mapping to only a single TCI field codepoint, the MAC-CE may serve as the beam indication. In such examples, the UE 120 may begin applying the beam indication indicated in the MAC-CE a certain time duration (for example, 3 ms) after a hybrid automatic repeat request acknowledgement (HARQ-ACK) transmitted to the network node 110 in response to the PDSCH communication carrying the MAC-CE.

If the MAC-CE indicates a mapping to more than one TCI field codepoint, DCI including an indication of a TCI field codepoint may be used to provide a beam indication to the UE. For example, the UE 120 may receive (for example, via a PDCCH communication) DCI that includes an indication of a TCI field codepoint. The TCI field codepoint may map to a unified TCI state indication, which may correspond to a joint downlink and uplink TCI state, a separate downlink and uplink TCI state pair, a downlink only TCI state, or an uplink only TCI state. In some examples, downlink DCI (for example, DCI format 1_1/1_2), with or without a downlink assignment, may be used to provide the beam indication (for example, the indication of the TCI field codepoint). The DCI that includes the indication of the TCI field codepoint may be referred to a "beam indication DCI."

In some examples, a network node may operate using different operating states. In the different operating states, the network node may use different antennas, different antenna panels, different antenna configurations, and/or different TRPs to communicate with one or more UEs. For example, an operating state may include an energy saving mode. In the energy saving mode, the network node may operate using an antenna configuration that uses less antennas (for example, to save energy). In another operating state, the network node may operate using an antenna configuration that uses more antennas (for example, for improved communication performance). Therefore, in the energy saving mode, the network node may be unable to communicate with a UE using one or antennas and/or antenna panels (for example, that are inactive during the energy saving mode, but would otherwise be available in the other operating state). As another example, an operating state may be associated with a state of a TRP associated with the network node. For example, a TRP may be dormant (for example, inactive) to save energy, such as when there are no UEs within a coverage area of the TRP. Therefore, in such operating states, the network node may be unable to communicate with a UE via a dormant TRP.

As another example, an operating state may include a full-duplex mode. For example, the network node may operate in a full-duplex mode (for example, may transmit and receive communications at the same time). As described elsewhere herein, a network node operating in a full-duplex mode may experience self-interference. For example, a downlink transmission from the network node may self-interfere with an uplink transmission to the network node. This may be caused by a variety of factors, such as the higher transmit power for the downlink transmission (as compared to the uplink transmission) and/or radio frequency bleeding, among other examples. Therefore, to improve spatial isolation, the network node may use a first antenna and/or a first TRP for downlink signals and a second antenna and/or a second TRP for uplink signals when operating in the full-duplex mode. For example, improving a spatial isolation of the first antenna and/or the first TRP from the second antenna and/or the second TRP may reduce self-interference associated with full-duplex operations. Therefore, the first antenna and/or the first TRP of the network node may be unavailable for uplink signals and the second antenna and/or the second TRP of the network node may be unavailable for downlink signals when the network node is operating in the full-duplex mode.

Therefore, when a network node is operating in some operating states a TRP or antenna of the network node may be available (for example, for uplink communications and/or for downlink communications), but when the network node is operating in other operating states the TRP or the antenna of the network node may be unavailable (for example, for uplink communications and/or for downlink communications). As a result, the network node may switch a TCI state used by a UE when the network node switches to a given operating state (for example, if a previous TCI state used by the UE is associated with a TRP or antenna that is unavailable when the network node is operating in the given operating state). This increases a signaling overhead associated with the network node transmitting beam indications (for example, MAC-CE communications and/or DCI communications) to switch the TCI state of a UE when the network node switches the operating state. Additionally, in some cases, the UE may be unable to switch to the TCI state indicated by the network node in time for a scheduled communication when the network node switches the operating state near the scheduled communication (for example, switching the TCI state may be associated with some processing time at the UE), which may result in the UE being unable to transmit or receive the scheduled communication.

Various aspects relate generally to TCI states associated with different operating states of a network node. Some aspects more specifically relate to a TCI state (for example, a unified TCI state) that includes an indication of an associated operating state of the network node. In some aspects, a UE may use or apply the TCI state (for example, for a communication direction and/or signal associated with the TCI state) during a time interval (for example, a slot or OFDM symbol) that is associated with the operating state. For example, the UE may receive an indication that a time interval is associated with the operating state of the network node. In some aspects, the time interval being associated with the operating state may be in accordance with a pattern (for example, a pattern of operating states over time indicated by the network node). The UE may identify an operating state associated with a current time interval and may apply the TCI state that is associated with the operating state.

In some aspects, the pattern may be associated with a TDD configuration indicating a slot pattern. For example, the slot pattern may indicate whether a slot is a downlink slot, an uplink slot, or a full-duplex slot. The UE may receive an indication that a TCI state (for example, a unified TCI state) is associated with a full-duplex mode of the network node. Therefore, during full-duplex slots, the UE may communicate (for example, transmit or receive) using the TCI state that is associated with the full-duplex mode. During other slots (for example, uplink slots or downlink slots), the UE may communicate (for example, transmit or receive) using another indicated or activated TCI state (for example, and may not use the TCI state that is associated with the full-duplex mode).

Particular aspects of the subject matter described in this disclosure can be implemented to realize one or more of the following potential advantages. In some examples, the described techniques can be used to reduce a signaling overhead associated with switching a TCI state used by the UE when the network node changes operating states. In some examples, an amount of time associated with the UE switching to the TCI state associated with a given operating state is reduced because a processing time associated with receiving a beam indication (for example, receiving an indication of the TCI state) may be reduced or eliminated. Configuring a TCI state to be associated with a given duplex mode (for example, full-duplex or half-duplex) may reduce self-interference at the network node by enabling the network node to use spatially isolated antennas and/or TRPs for respective communication directions, while also reducing a signaling overhead associated with the network node indicating to the UE to use the TCI state that enables the spatial isolation. Additionally, configuring a TCI state to be associated with an energy saving mode of the network node (for example, associated with an inactive antenna or TRP) may result in improved energy savings at the network node, while also reducing a signaling overhead associated with the network node indicating to the UE to use the TCI state that is not associated with the inactive antenna or TRP.

Figure 8:
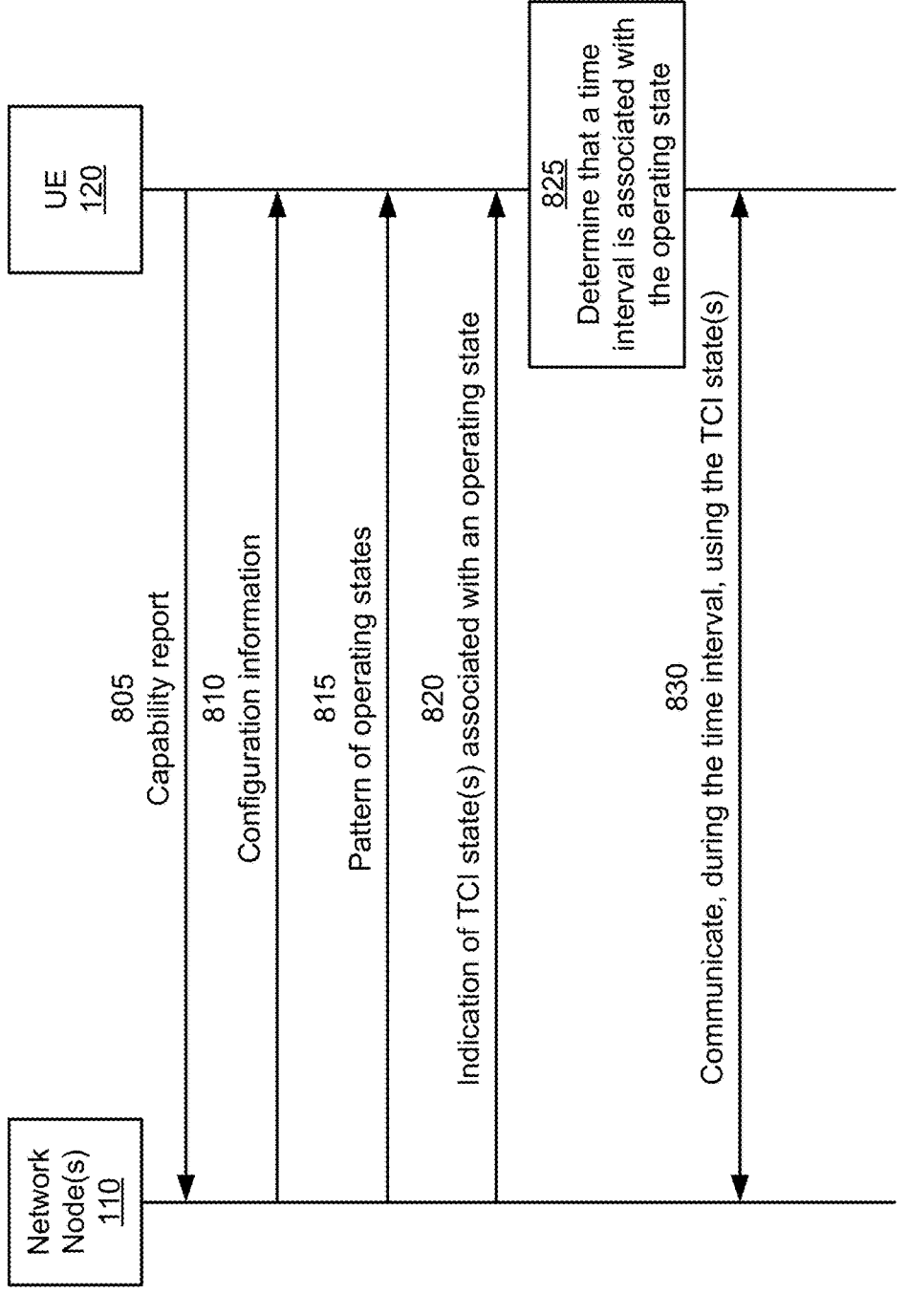
FIG. 8 is a diagram of an example associated with operations for transmission configuration indicator (TCI) states associated with different operating states in accordance with the present disclosure.

FIG. 8 is a diagram of an example associated with operations 800 for TCI states associated with different operating states in accordance with the present disclosure. As shown in FIG. 8, one or more network nodes 110 (for example, a base station, a CU, a DU, and/or an RU) may communicate with a UE 120. In some aspects, the network node 110 and the UE 120 may be part of a wireless network (for example, the wireless network 100). The UE 120 and the network node 110 may have established a wireless connection prior to operations shown in FIG. 8. In some aspects, the network node 110 may be associated with two or more TRPs.

In a first operation 805, the UE 120 may transmit, and the network node 110 may receive, a capability report. The UE 120 may transmit the capability report via UE capability signaling, a UE assistance information (UAI) communication, an RRC communication, a PUSCH, and/or a PUCCH, among other examples. The capability report may indicate UE support for one or more operations described herein. For example, the capability report may indicate whether the UE 120 supports a TCI state that is associated with a given operating state of the network node 110. For example, the capability report may indicate whether the UE 120 supports a unified TCI state that is associated with a duplex mode of the network node 110, that is associated with an energy saving mode of the network node 110, and/or that is associated with an antenna configuration of the network node 110, among other examples. In some aspects, the capability report may indicate that the UE 120 supports a unified TCI framework, as described in more detail elsewhere herein.

In some aspects, the capability report may indicate whether the UE 120 supports being configured with a TCI state that is specific to a given operating state of the network node 110, as described in more detail elsewhere herein. For example, the capability report may indicate whether the UE 120 supports using a TCI state that is specific to a duplex mode or a duplex type (for example, full-duplex, subband-full-duplex, non-full-duplex, or half-duplex). In some aspects, the capability report may indicate whether the UE 120 supports using a TCI state that is specific to a slot type or symbol type (for example, where the slot type or symbol type corresponds to an operating state of the network node 110).

The network node 110 may configure the UE 120 in accordance with the capability report. For example, the network node 110 may configure, or may trigger, the UE 120 to perform one or more operations based on, in response to, or otherwise associated with the capability report indicating that the UE 120 supports the one or more operations. For example, the network node 110 may indicate that the UE 120 is to use a TCI state that is associated with a specific operating state of the network node 110 (for example, as described in more detail elsewhere herein) based on, in response to, or otherwise associated with the capability report indicating that the UE 120 supports such TCI states.

In a second operation 810, the network node 110 may transmit, and the UE 120 may receive, configuration information. In some aspects, the UE 120 may receive the configuration information via one or more of system information signaling, RRC signaling, one or more MAC-CEs, and/or DCI, among other examples. In some aspects, the configuration information may include an indication of one or more configuration parameters for selection by the UE 120, and/or explicit configuration information for the UE 120 to use to configure itself, among other examples.

In some aspects, the configuration information may indicate that the UE 120 is to use a TCI state that is associated with an operating state of the network node 110 (for example, during time intervals associated with the operating state). As used herein, "time interval" may refer to a slot, an OFDM symbol, or another time interval indicated or configured by the network node 110. For example, the configuration information may indicate that, during a time interval associated with a given operating state of the network node 110, the UE 120 is to communicate using a TCI state that is associated with the given operating state (for example, if such a TCI state is activated for the UE 120).

In some aspects, the configuration information may indicate a pattern of time intervals associated with respective operating states of the network node 110. For example, the configuration information may indicate one or more time intervals during which the network node 110 is operating in a given operating state. For example, the configuration information may indicate one or more time intervals during which the network node 110 will be operating in given duplex mode, an energy saving mode, and/or using a given antenna configuration, among other examples.

For example, the configuration information may indicate a slot pattern. For example, the configuration information may include a TDD configuration. The slot pattern may indicate operating states for respective slots. For example, the slot pattern may indicate a pattern of uplink slots, downlink slots, and/or full-duplex slots (for example, sub-band-full-duplex slots). As another example, the slot pattern may indicate slots during which the network node 110 is operating in an energy saving mode and/or using a given antenna configuration.

In some aspects, the configuration information may indicate one or more TCI states. For example, the configuration information may indicate, for a given TCI state, (for example, via a TCI state information element) a TCI state identification (such as a tci-StateID), a QCL type (such as a qcl-Type1, qcl-Type2, qcl-TypeA, a qcl-TypeB, a qcl-TypeC, or a qcl-TypeD), a cell identification (such as a ServCellIndex), a bandwidth part identification (such as a bwp-Id), and/or a reference signal identification (such as an NZP-CSI-RS-ResourceId or an SSB-Index), among other examples. In some aspects, the configuration information may indicate, for a given TCI state, (for example, via a TCI state information element) an operating state associated with the TCI state. In other examples, a communication activating the TCI state or triggering the UE 120 to use the TCI state (for example, a beam indication) may indicate an operating state associated with the TCI state. In other words, the configuration information may configure one or more TCI states (for example, one or more unified TCI states). A beam indication may indicate, for a TCI state from the one or more TCI states configured for the UE 120, an operating state (for example, of the network node 110) associated with the TCI state.

The UE 120 may configure itself based at least in part on the configuration information. In some aspects, the UE 120 may be configured to perform one or more operations described herein based at least in part on the configuration information.

In a third operation 815, the network node 110 may transmit, and the UE 120 may receive, an indication of a pattern indicating time intervals associated with the respective operating states. For example, the indication of the pattern may be included in an RRC communication, a MAC-CE communication, and/or a DCI communication. For example, the network node 110 may indicate a pattern of operating states, of the network node 110, in time. In some aspects, the pattern may be a periodic pattern (for example, that repeats over time). In some aspects, the pattern may be dynamic (for example, the network node 110 may indicate that the network node 110 is to operate in a first operating state for the next X milliseconds and that the network node 110 is to operate in a second operating state after the X milliseconds). An example pattern of operating states is depicted and described in more detail in connection with FIG. 9.

As described elsewhere herein, different operating states may be associated with different available beams and/or TCI states. For example, when the network node is operating in a first operating state, a first one or more beams and/or a first one or more TCI states may be available for use (for example, for uplink communications and/or for downlink communications). When the network node is operating in a second operating state, a second one or more beams and/or a first one or more TCI states may be available for use (for example, for uplink communications and/or for downlink communications). As described in more detail elsewhere herein, rather than indicate (for example, via a beam indication) a new TCI state for each UE that is using an unavailable TCI state when the network node 110 switches to a new operating state, the network node 110 may indicate operating states associated with respective TCI states. Therefore, the UE 120 may switch (for example, without an explicit instruction from the network node 110) to an available TCI state for a given operating state during a time interval associated with the given operating state (for example, as indicated by the pattern in the second operation 810 or the third operation 815).

In a fourth operation 820, the network node 110 may transmit, and the UE 120 may receive, an indication of a TCI state associated with an operating state of the network node 110. For example, the network node 110 may transmit, and the UE 120 may receive, an indication of a TCI state and an indication of an operating state to be associated with the TCI state. In some aspects, network node 110 may transmit, and the UE 120 may receive, a communication that activates one or more TCI states associated with respective operating states. The communication may be a beam indication. For example, the communication may include a MAC-CE communication and/or a DCI communication. For example, as described elsewhere herein, one or more TCI states indicated by the communication may be applied to downlink or uplink signals or channels (for example, after an application time) during time intervals that are associated with the operating state indicated for the one or more TCI states.

In some aspects, the communication may indicate one or more unified TCI states. For example, separate uplink and downlink TCI states may be used as the unified TCI state type. In such examples, the communication may indicate one or more downlink TCI states and one or more uplink TCI states for each operating state. For example, the communication may indicate a first one or more downlink TCI states and a first one or more uplink TCI states for a first operating state and a second one or more downlink TCI states and a second one or more uplink TCI states for a second operating state. As another example, the communication may indicate a downlink TCI state that is associated with one or more operating states and/or an uplink TCI state that is associated with one or more operating states. In other words, one TCI state may be applied to multiple operating states. For example, the communication may indicate that a downlink TCI state is associated with a first operating state and a second operating state. The communication may indicate that a first uplink TCI state is associated with the first operating state and that a second uplink TCI state is associated with the second operating state.

As another example, a joint uplink and downlink TCI state may be indicated by the communication. For example, the communication may indicate that a joint uplink and downlink TCI state is associated with a first operating state (for example, a non-full-duplex operating state). In other words, the communication may indicate a joint uplink and downlink TCI state for a duplex type (for example, non-full-duplex) that is configured with the joint unified TCI type. The communication may indicate that a downlink TCI state and an uplink TCI state is associated with a second operating state (for example, a full-duplex operating state). In other words, the communication may indicate a downlink TCI state and an uplink TCI state for a duplex type (for example, full-duplex) configured with the separate DL/UL unified TCI type.

In some aspects, in the fourth operation 820, the network node 110 may transmit, and the UE 120 may receive, a MAC-CE communication activating one or more TCI states for a given operating state. The MAC-CE communication may map the one or more TCI states to respective TCI codepoints. In some aspects, in the fourth operation 820, the network node 110 may transmit, and the UE 120 may receive, a DCI communication indicating a TCI codepoint (for example, in a TCI field of the DCI). The UE 120 may identify the TCI state for the operating state based on, in response to, or otherwise associated with the TCI state mapped to the TCI codepoint (for example, by the MAC-CE communication). In some aspects, the MAC-CE communication may indicate only a single TCI state for a given operating state. In such examples, a DCI communication may not be communicated between the UE 120 and the network node 110 (for example, and the UE 120 may identify that the single TCI state is to be used during time intervals associated with the given operating state).

In some aspects, two or more TCI states may be activated or indicated for a given communication direction, channel, and/or reference signal (for example, for multi-TRP (mTRP) operations) and for a given operating state. For example, two or more TCI states may be applied to downlink or uplink channels/signals. As described elsewhere herein, a set of available TCI states for downlink or uplink channels/signals may be based on, in response to, or otherwise associated with an operating state of the network node 110. For example, a MAC-CE communication may map a TCI codepoint to one or more operating states and to two downlink TCI states and two UL TCI states (for example, for mTRP downlink and uplink). Similarly, a MAC-CE communication may map a TCI codepoint to one or more operating states and to two joint uplink and downlink TCI states (for example, for mTRP downlink and uplink). As another example, a MAC-CE communication may map a TCI codepoint to one or more operating states and to two downlink TCI states and one uplink TCI state (for example, for mTRP downlink, and single TRP (sTRP) uplink). As another example, a MAC-CE communication may map a TCI codepoint to one or more operating states and to one downlink TCI state and two uplink TCI states (for example, for sTRP downlink, and mTRP uplink). For example, some operating states (for example, some duplex types) may be indicated with a single TCI state (for example, a single pair of uplink and downlink TCI states, or a single joint TCI state), while the other operating states (for example, other duplex types) may be indicated with more than one TCI state for at least one communication direction, channel, or reference signal, in a similar manner as described above.

In some aspects, a single MAC-CE communication may be used for multiple operating states of the network node 110. In some aspects, one MAC-CE communication may be used for TCI state activation for multiple (for example, for all) operating states (for example, for multiple duplex modes or multiple duplex types). For example, for each activated TCI state indicated in the MAC-CE communication, a field in the MAC-CE communication may indicate one or more applicable operating states (for example, from the multiple operating states) for the activated TCI state. The MAC-CE communication may map a TCI codepoint to one or more operating states. For example, for each operating state mapping to the TCI codepoint, the MAC-CE communication may indicate one or more TCI states.

For example, the MAC-CE communication may indicate that a TCI codepoint is associated with a first operating state and a second operating state. The MAC-CE communication may indicate one or more TCI states (for example, a joint downlink and uplink TCI state, an uplink TCI state, and/or a downlink TCI state) associated with the TCI codepoint and the first operating state. Additionally, the MAC-CE communication may indicate one or more TCI states (for example, a joint downlink and uplink TCI state, an uplink TCI state, and/or a downlink TCI state) associated with the TCI codepoint and the second operating state. An example of a MAC-CE communication indicating TCI states and/or TCI codepoints for multiple operating states is depicted and described in more detail in connection with FIG. 12.

A DCI communication may indicate a TCI codepoint (for example, indicated by the single MAC-CE communication) in a TCI field of the DCI. For each operating state mapped to the TCI codepoint, the UE 120 may apply the corresponding TCI states. For example, during time intervals associated with a first operating state mapped to the TCI codepoint, the UE 120 may apply a first one or more TCI states. During time intervals associated with a second operating state mapped to the TCI codepoint, the UE 120 may apply a second one or more TCI states.

In some aspects, in the fourth operation 820, the network node 110 may transmit, and the UE 120 may receive, separate MAC-CE communications activating TCI state(s) for respective operating states. For example, the network node 110 may transmit, and the UE 120 may receive, a first MAC-CE communication activating one or more TCI states for a first operating state. The network node 110 may transmit, and the UE 120 may receive, a second MAC-CE communication activating one or more TCI states for a second operating state. For example, a MAC-CE communication may include a field indicating an operating state (for example, a duplex type or a duplex mode) associated with all TCI states indicated by the MAC-CE communication. An example of separate MAC-CE communications indicating TCI states and/or TCI codepoints for multiple operating states is depicted and described in more detail in connection with FIG. 13.

In such examples, a DCI communication may indicate a TCI codepoint (for example, indicated by the single MAC-CE communication) in a TCI field of the DCI. The DCI communication may be associated with a given operating state. The UE 120 may identify one or more TCI states to be applied for the given operating state based on, in response to, or otherwise associated with TCI state(s) mapped to the TCI codepoint in a MAC-CE communication associated with the given operating state. The DCI communication may be associated with a given operating state based on, in response to, or otherwise associated with a DCI format associated with the DCI communication. For example, a first DCI format (for example, DCI format 1_1, or a DCI format for PDSCH scheduling) may be associated with a first operating state, a second DCI format (for example, DCI format 1_2, or a DCI format for PUSCH scheduling) may be associated with a second operating state, and so on.

As another example, the DCI communication may include an indication of the operating state associated with the DCI communication (for example, the DCI communication may include an explicit indication of the operating state). For example, the DCI communication may include a field indicating the operating state. For example, if the DCI communication does not schedule a communication (for example, is only a beam indication DCI), there may be one or more unused fields of the DCI communication. In such examples, an unused field may be used to indicate the operating state associated with the DCI communication.

As another example, the DCI communication may be associated with an operating state based on, in response to, or otherwise associated with a timing of the DCI communication. For example, the DCI communication may be associated with an operating state based on, in response to, or otherwise associated with when the DCI communication is received by the UE 120. In some aspects, the DCI communication may be associated with an operating state that is associated with the time interval during which the DCI communication is received by the UE 120. For example, if the DCI communication is received by the UE 120 during a full-duplex slot, then the UE 120 may determine that the DCI communication is associated with a full-duplex operating state. As another example, if the DCI communication is received by the UE 120 during a downlink slot or a flexible slot, then the UE 120 may determine that the DCI communication is associated with a non-full-duplex operating state.

In some aspects, in the fourth operation 820, the indication of the TCI states and the operating state may be based on, in response to, or otherwise associated with a CORESET pool index value. For example, one or more operations described herein may be applied for a given CORESET pool index value. For example, for multi-DCI operations two or more CORESET pool index values may be configured and channels/signals may be associated with one CORESET pool index value. For example, MAC-CE communications and/or DCI communications described herein may be associated with a given CORESET pool index value. The TCI state(s) identified based on, in response to, or otherwise associated with the MAC-CE communication(s) and/or DCI communication(s) may be applied for communications associated with the given CORESET pool index value. For example, in the case where a single MAC-CE communication is used to active TCI state(s) for multiple operating states, the network node 110 may transmit and the UE 120 may receive, a first MAC-CE communication associated with the multiple operating states and a first CORESET pool index value. Additionally, the network node 110 may transmit and the UE 120 may receive, a second MAC-CE communication associated with the multiple operating states and a second CORESET pool index value. In examples where separate MAC-CE communications are used to activate TCI states for respective operating states, the network node 110 may transmit and the UE 120 may receive, a first MAC-CE communication associated with a first operating state and a first CORESET pool index value. The network node 110 may transmit and the UE 120 may receive, a second MAC-CE communication associated with the first operating state and a second CORESET pool index value. The network node 110 may transmit and the UE 120 may receive, a third MAC-CE communication associated with a second operating state and the first CORESET pool index value. The network node 110 may transmit and the UE 120 may receive, a fourth MAC-CE communication associated with the second operating state and the second CORESET pool index value. In other words, in the fourth operation 820, the network node 110 may indicate TCI states per operating state and per CORESET pool index value.

For example, the network node 110 and/or the UE 120 may determine that a given beam (for example, associated with a TRP and/or antenna of the network node 110) is a best beam for the UE 120 for both uplink signals and downlink signals. The beam may be associated with a first uplink TCI state and a first downlink TCI state (for example, assuming separate downlink and uplink unified TCI states) or a joint uplink and downlink TCI state. In some examples, when the network node 110 is operating in a first operating state, the beam (for example, the TRP and/or the antenna of the network node) may be available for both uplink signals and downlink signals. When the network node 110 is operating in a second operating state, the beam (for example, the TRP and/or the antenna of the network node) may be unavailable for at least one of uplink signals or downlink signals. For example, assuming that the beam is unavailable for uplink signals when the network node 110 is operating in the second operating state, during time intervals associated with the second operating state, the UE 120 may communicate using the first downlink TCI state and a second uplink TCI state (for example, the communication may indicate that a TCI state associated with the second operating state includes the first downlink TCI state and the second uplink TCI state). During time intervals associated with the first operating state, the UE 120 may communicate using the first downlink TCI state and the first uplink TCI state or the joint uplink and downlink TCI state. In other words, during time intervals associated with the first operating state, the UE 120 may apply the first downlink TCI state and the first uplink TCI state or the joint uplink and downlink TCI state. During time intervals associated with the first operating state, the UE 120 may apply the first downlink TCI state and the second uplink TCI state. This may ensure that the UE 120 does not attempt to use the unavailable TRP or antenna while the network node 110 is operating in the second operating state (for example, without an explicit beam indication that is transmitted after the network node 110 switches to operating in the second operating state).

In a fifth operation 825, the UE 120 may determine that a current time interval is associated with a given operating state. For example, the UE 120 may determine, based on, in response to, or otherwise associated with the pattern indicated in the second operation 810 or the third operation 815, an operating state associated with a current time interval (for example, a current slot, OFDM symbol, or other time interval). In some aspects, the UE 120 may determine a CORESET pool index value associated with a channel or communication direction to be used by the UE 120 (for example, during the current time interval). The UE 120 may identify one or more TCI states to be applied based on, in response to, or otherwise associated with the given operating state (for example, that is associated with the current time interval) and based on, in response to, or otherwise associated with the TCI state(s) activated as part of the fourth operation 820. For example, the UE 120 may determine that a current time interval is associated with a full-duplex operating state. The UE 120 may identify one or more TCI states to be applied during the current time interval (for example, based on, in response to, or otherwise associated with a TCI codepoint indicated by a DCI communication and one or more TCI states mapped to the TCI codepoint and to the full-duplex operating state by a MAC-CE communication). In some aspects, the UE 120 may identify the one or more TCI states based on, in response to, or otherwise associated with the CORESET pool index value associated with a channel or communication direction to be used by the UE 120 (for example, during the current time interval).

In a sixth operation 830, the network node 110 and the UE 120 may communicate, during the time interval, using the one or more TCI states associated with the time interval. For example, the UE 120 may transmit or receive, during a time interval of the time intervals associated with different operating states, a communication using one or more TCI states that are associated with an operating state associated with the time interval (for example, as indicated by the pattern). In other words, the UE 120 may have activated TCI states for multiple operating states of the network node 110. The UE 120 may apply one or more TCI states, from the activated TCI states, during a time interval based on, in response to, or otherwise associated with an operating state, from the multiple operating states, that is associated with the time interval. The UE 120 may communicate using the applied TCI state(s).

Figure 9:
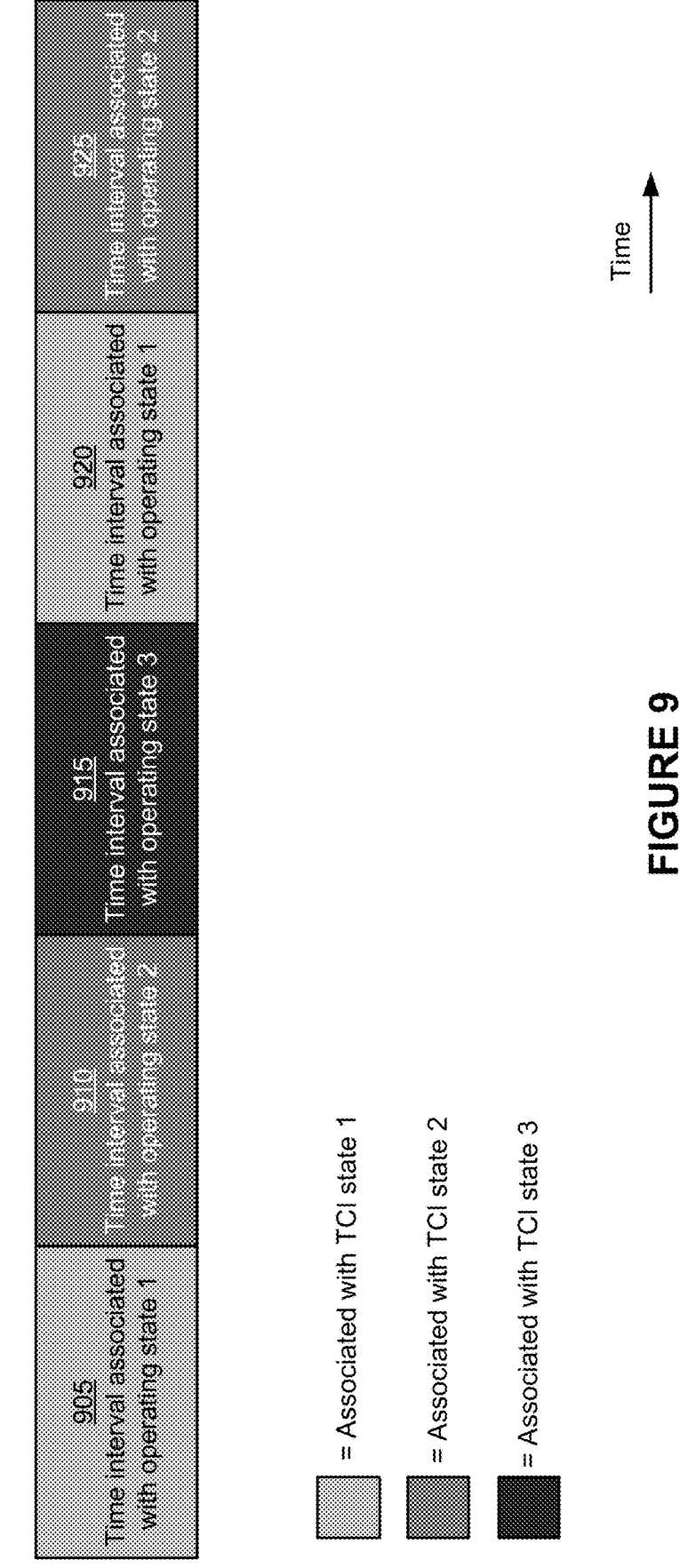
FIG. 9 is diagram of an example associated with a pattern of operating states of a network node and corresponding TCI states in accordance with the present disclosure.

FIG. 9 is diagram of an example associated with a pattern 900 of operating states of a network node and corresponding TCI states in accordance with the present disclosure. For example, as shown in FIG. 9, a network node 110 may operate in different operating states during different time intervals. In some aspects, an order of the operating states may be periodic and/or based on, in response to, or otherwise associated with a pattern. For example, as shown in FIG. 9, during a first time interval 905, the network node 110 may operate in an operating state 1. During a second time interval 910, the network node 110 may operate in an operating state 2. During a third time interval 915, the network node 110 may operate in an operating state 3. During a fourth time interval 920, the network node 110 may operate in the operating state 1. During a fifth time interval 925, the network node 110 may operate in the operating state 2. The pattern of operating states and time intervals may continue over time in a similar manner. As described elsewhere herein, the time intervals may be slots, OFDM symbol(s), and/or other time intervals.

As shown in FIG. 9, during the first time interval 905, a UE 120 may apply a TCI state 1. The TCI state 1 may be a unified TCI state associated with the operating state 1, as described in more detail elsewhere herein. For example, the TCI state 1 may include one or more uplink TCI states, one or more downlink TCI states, and/or one or more joint uplink and downlink TCI states. The UE 120 may communicate (for example, transmit and/or receive) one or more communications during the first time interval 905 associated with applying the TCI state 1. During the second time interval 910, the UE 120 may apply a TCI state 2. The TCI state 2 may be a unified TCI state associated with the operating state 2, as described in more detail elsewhere herein. For example, the TCI state 2 may include one or more uplink TCI states, one or more downlink TCI states, and/or one or more joint uplink and downlink TCI states. The UE 120 may communicate (for example, transmit and/or receive) one or more communications during the second time interval 910 associated with applying the TCI state 2.

During the third time interval 915, the UE 120 may apply a TCI state 3. The TCI state 3 may be a unified TCI state associated with the operating state 3, as described in more detail elsewhere herein. For example, the TCI state 3 may include one or more uplink TCI states, one or more downlink TCI states, and/or one or more joint uplink and downlink TCI states. The UE 120 may communicate (for example, transmit and/or receive) one or more communications during the third time interval 915 associated with applying the TCI state 3. During the fourth time interval 920, the UE 120 may apply the TCI state 1 (for example, because the fourth time interval 920 is associated with the operating state 1). Similarly, during the fifth time interval 925, the UE 120 may apply the TCI state 2 (for example, because the fifth time interval 925 is associated with the operating state 2).

Figure 10:
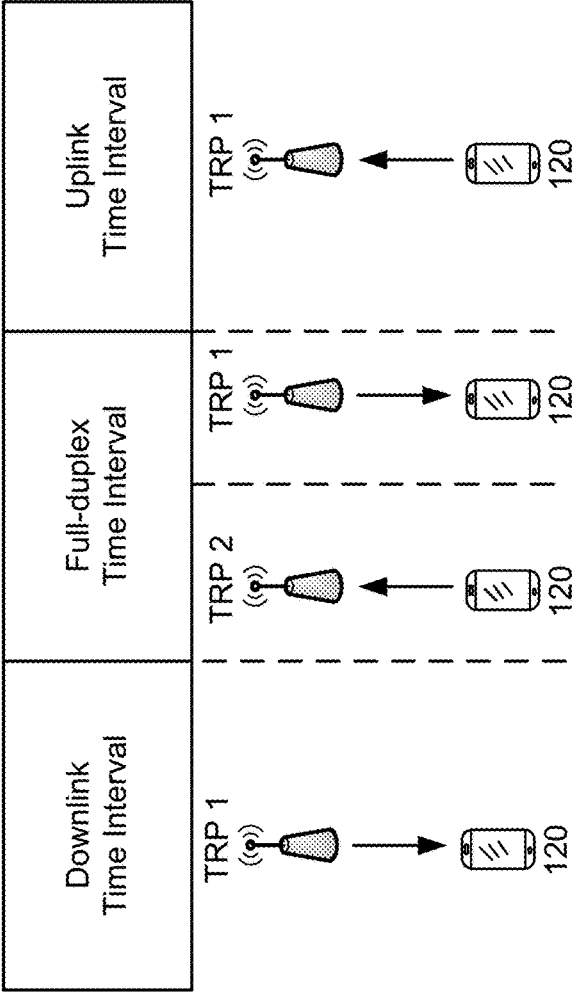
FIG. 10 is diagram of an example associated with TCI states associated with different operating states in accordance with the present disclosure.

FIG. 10 is diagram of an example associated with TCI states 1000 associated with different operating states in accordance with the present disclosure. FIG. 10 shows an example in which the operating states are duplex types or duplex modes. However, the operations described herein may be similarly applied for other operating states of a network node 110. The example depicted in FIG. 10 may be associated with sTRP operations. As shown in FIG. 10, the UE 120 may be configured with time intervals (for example, slots or symbols) associated with different duplex types. For example, some time intervals may be non-full-duplex time intervals (for example, downlink time intervals or uplink time intervals). Other time intervals may be full-duplex time intervals (for example, a subband-full-duplex time interval).

As an example, a network node 110 may be associated with multiple TRPs, such as a TRP 1 and a TRP 2. The TRP 1 may be selected for downlink and uplink communications with the UE 120. For example, the TRP 1 may be associated with the best radio conditions among the multiple TRPs associated with the network node 110 (for example, may have a highest RSRP, a highest RSRQ, or a best value of another parameter). Therefore, as shown, the UE 120 may communicate with the network node 110 via the TRP 1 during non-full-duplex time intervals (for example, for uplink communications and downlink communications). For example, the network node 110 may indicate that the UE 120 is to use a TCI state (for example, an uplink TCI state 1, a downlink TCI state 1, and/or a joint uplink and downlink TCI state) that is associated with a spatial direction toward the TRP 1 during the non-full-duplex time intervals.

However, as described elsewhere herein, when the network node 110 is operating in a full-duplex mode, the network node 110 may not use the TRP 1 for a given communication direction to improve spatial isolation of TRPs and/or antennas used for uplink signals and downlink signals at the network node 110. For example, as shown in FIG. 10, the TRP 1 may not be available for uplink communications when the network node 110 is operating in the full-duplex mode. Therefore, the network node 110 may indicate to the UE 120 to use a TCI state associated with another TRP (for example, the TRP 2) for uplink communications during full-duplex time intervals. For example, the network node 110 may indicate that, during full-duplex time intervals, the UE 120 is to use an uplink TCI state (for example, an uplink TCI state 2) associated with a spatial direction toward the TRP 2 and the UE 120 is to use a downlink TCI state (for example, the downlink TCI state 1) that is associated with the spatial direction toward the TRP 1.

The UE 120 may select which TCI state(s) to apply based on, in response to, or otherwise associated with a current time interval. For example, the UE 120 may apply the downlink and uplink TCI state(s) (for example, the uplink TCI state 1, the downlink TCI state 1, and/or the joint uplink and downlink TCI state) that are associated with a spatial direction toward the TRP 1 during the non-full-duplex time intervals. Similarly, the UE 120 may apply the uplink TCI state (for example, the uplink TCI state 2) associated with the spatial direction toward the TRP 2 and the downlink TCI state (for example, the downlink TCI state 1) that is associated with the spatial direction toward the TRP 1 during full-duplex time intervals. As a result, a signaling overhead may be conserved because the network node 110 may only have to signal or activate the TCI states once (for example, rather than before each different type of time interval) and the UE 120 may selectively apply the TCI state(s) corresponding to a current time interval.

Figure 11:
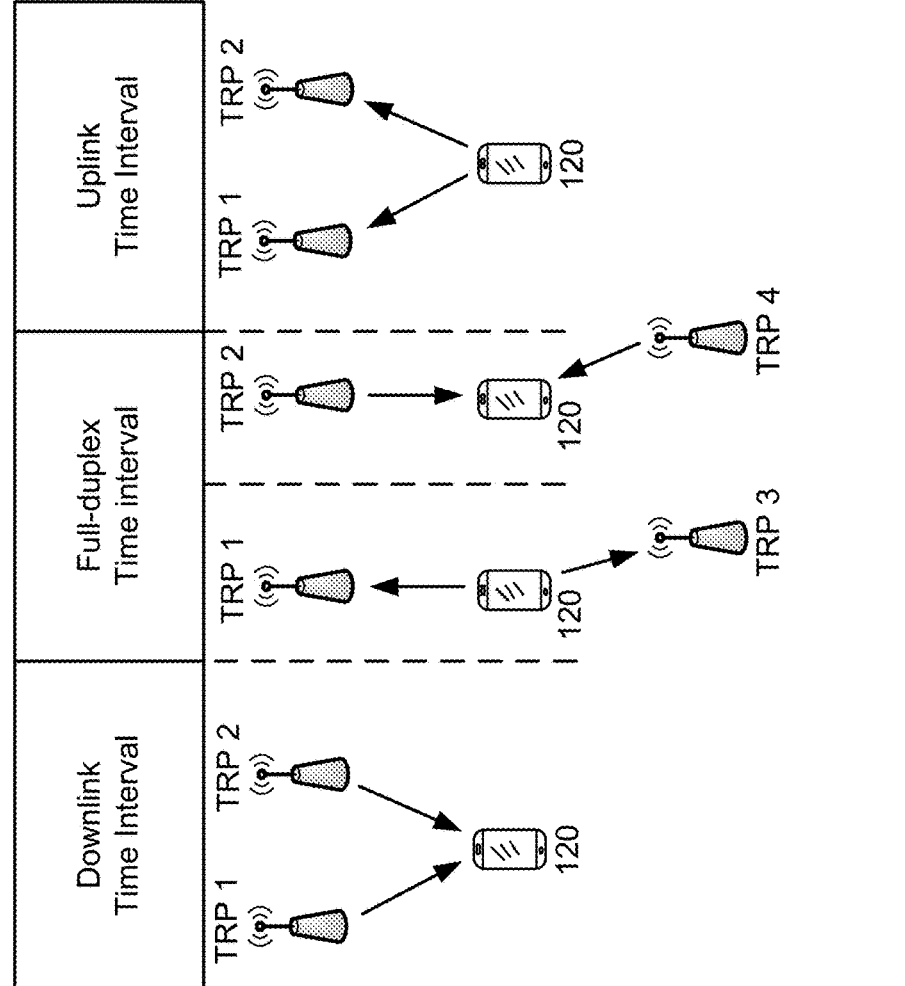
FIG. 11 is diagram of an example associated with TCI states associated with different operating states in accordance with the present disclosure.

FIG. 11 is diagram of an example associated with TCI states 1100 associated with different operating states in accordance with the present disclosure. FIG. 11 shows an example in which the operating states are duplex types or duplex modes. However, the operations described herein may be similarly applied for other operating states of a network node 110. The example depicted in FIG. 11 may be associated with mTRP operations. As shown in FIG. 11, the UE 120 may be configured with time intervals (for example, slots or symbols) associated with different duplex types. For example, some time intervals may be non-full-duplex time intervals (for example, downlink time intervals or uplink time intervals). Other time intervals may be full-duplex time intervals (for example, a subband-full-duplex time interval).

As an example, a network node 110 may be associated with multiple TRPs, such as a TRP 1, a TRP 2, a TRP 3, and a TRP 4. The TRP 1 and the TRP 2 may be selected for downlink and uplink communications with the UE 120 for mTRP operations. For example, the TRP 1 and the TRP 2 may be associated with the best radio conditions among the multiple TRPs associated with the network node 110 (for example, may have a highest RSRP, a highest RSRQ, or a best value of another parameter). Therefore, as shown, the UE 120 may communicate with the network node 110 via the TRP 1 and the TRP 2 during non-full-duplex time intervals (for example, for uplink communications and downlink communications). For example, the network node 110 may indicate that the UE 120 is to use TCI states (for example, an uplink TCI state 1 and an uplink TCI state 2, a downlink TCI state 1 and a downlink TCI state 1, and/or a first joint uplink and downlink TCI state and a second joint uplink and downlink TCI state) that is associated with spatial directions toward the TRP 1 and the TRP 2 during the non-full-duplex time intervals.

However, as described elsewhere herein, when the network node 110 is operating in a full-duplex mode, the network node 110 may not use the TRP 1 and/or the TRP 2 for a given communication direction to improve spatial isolation of TRPs and/or antennas used for uplink signals and downlink signals at the network node 110. For example, as shown in FIG. 11, the TRP 1 may not be available for downlink communications and the TRP 2 may not be available for uplink communications when the network node 110 is operating in the full-duplex mode. Therefore, the network node 110 may indicate to the UE 120 to use TCI states associated with other TRPs (for example, the TRP 2) for uplink communications or downlink communications during full-duplex time intervals. For example, the network node 110 may indicate that, during full-duplex time intervals, the UE 120 is to use uplink TCI states (for example, the uplink TCI state 1 and an uplink TCI state 3) associated with spatial directions toward the TRP 1 and the TRP 3 and is to use downlink TCI states (for example, the downlink TCI state 2 and a downlink TCI state 4) that are associated with the spatial directions toward the TRP 2 and the TRP 4.

The UE 120 may select which TCI state(s) to apply based on, in response to, or otherwise associated with a current time interval. For example, the UE 120 may apply the downlink and uplink TCI state(s) that are associated with spatial directions toward the TRP 1 and the TRP 2 during the non-full-duplex time intervals. Similarly, the UE 120 may apply the uplink TCI states that are associated with the spatial directions toward the TRP 1 and the TRP 3 and the downlink TCI states that are associated with the spatial directions toward the TRP 2 and the TRP 4 during full-duplex time intervals. As a result, a signaling overhead may be conserved because the network node 110 may only have to signal or activate the TCI states once (for example, rather than before each different type of time interval) and the UE 120 may selectively apply the TCI state(s) corresponding to a current time interval (and/or corresponding to a CORESET pool index value of a channel or communication).

FIG. 12 is diagram of an example associated with joint TCI state indications 1200 for multiple operating states of a network node in accordance with the present disclosure. The table depicted in FIG. 12 may be an example of information indicated by a beam indication and/or a MAC-CE communication that activates TCI states for different operating states, as described in more detail elsewhere herein. Duplex types or duplex modes are described herein as an example of operating states. However, the operations described in connection with FIG. 12 (and elsewhere herein) may be similarly applied for other operating states of the network node 110.

As shown in FIG. 12, the beam indication and/or the MAC-CE communication may indicate TCI codepoints 1205, TCI states 1210 mapped to respective TCI codepoints 1205, and duplex modes 1215 mapped to respective TCI codepoints 1205 and/or TCI states 1210. For example, a TCI codepoint 0 may be mapped to a first unified TCI state (for example, a DL TCI state 1 and a UL TCI state 1) for a non-full-duplex mode and to a second unified TCI state (for example, the DL TCI state 1 and an UL TCI state 2) for a full-duplex mode. For example, a DCI communication may indicate the TCI codepoint 0 (for example, in a TCI field of the DCI communication). In such examples, the UE 120 may selectively apply the first unified TCI state during time intervals (for example, slots and/or OFDM symbols) associated with the non-full-duplex mode or the second unified TCI state during time intervals (for example, slots and/or OFDM symbols) associated with the full-duplex mode (for example, after an activation time from a feedback communication indicating that the DCI communication was successfully received by the UE 120). Other codepoints may be similarly mapped to unified TCI states and duplex modes. The UE 120 may selectively apply a unified TCI state mapped to an indicated TCI codepoint based on, in response to, or otherwise associated with a duplex mode or a duplex type associated with a current time interval, in a similar manner as described herein.

FIG. 13 is diagram of an example associated with separate TCI state indications for multiple operating states of a network node in accordance with the present disclosure. The tables depicted in FIG. 13 may be examples of information indicated by beam indications and/or MAC-CE communications that activate TCI states for different operating states, as described in more detail elsewhere herein. Duplex types or duplex modes are described herein as an example of operating states. However, the operations described in connection with FIG. 13 (and elsewhere herein) may be similarly applied for other operating states of the network node 110.

As shown in FIG. 13, a first communication 1300 (for example, a beam indication and/or a MAC-CE communication) may indicate TCI codepoints 1305, TCI states 1310 mapped to respective TCI codepoints 1305 for non-full duplex time intervals (for example, for a first operating state of the network node 110). For example, a TCI codepoint 0 may be mapped to a joint unified TCI state 1, a TCI codepoint 1 may be mapped to a joint unified TCI state 2, a TCI codepoint 2 may be mapped to a joint unified TCI state 3, and/or a TCI codepoint 3 may be mapped to a joint unified TCI state 4, among other examples. Similarly, a second communication 1315 (for example, a beam indication and/or a MAC-CE communication) may indicate TCI codepoints 1320, and TCI states 1325 mapped to respective TCI codepoints 1320 for full duplex time intervals (for example, for a second operating state of the network node 110). For example, a TCI codepoint 0 may be mapped to a DL TCI state 1 and a UL TCI state 1, a TCI codepoint 1 may be mapped to the DL TCI state 1 and a UL TCI state 2, a TCI codepoint 2 may be mapped to a DL TCI state 2 and the UL TCI state 1, and/or a TCI codepoint 3 may be mapped to a DL TCI state 4 and the UL TCI state 2, among other examples.

A DCI communication may indicate a TCI codepoint 1 (for example, in a TCI field of the DCI communication). The DCI communication may be associated with an operating state, as described in more detail elsewhere herein. For example, the UE 120 may determine that the DCI communication is associated with a full-duplex operating state (for example, is associated with full-duplex time intervals). In such examples, the UE 120 may apply a first unified TCI state (for example, the DL TCI state 1 and the UL TCI state 2) mapped to the TCI codepoint 1 in the communication 1315 during time intervals (for example, slots and/or OFDM symbols) associated with the full-duplex mode. The UE 120 may receive another DCI communication indicating a TCI codepoint 2. The UE 120 may determine that the other DCI communication is associated with a non-full-duplex operating state (for example, is associated with non-full-duplex time intervals). In such examples, the UE 120 may apply a second unified TCI state (for example, the joint unified TCI state 3) mapped to the TCI codepoint 2 in the communication 1300 during time intervals (for example, slots and/or OFDM symbols) associated with the non-full-duplex mode.

Although some examples are depicted and described in connection with a single TCI state being indicated or mapped for a given communication direction, in some cases, multiple TCI states may be indicated for a given communication direction (for example, to support mTRP operations). For example, the communication 1315 may map the TCI codepoint 1 to the DL TCI state 1, a DL TCI state 3, the UL TCI state 2, and an UL TCI state 3. Similarly, as described elsewhere herein, a beam indication and/or MAC-CE communication activating TCI state(s) may be associated with, or mapped to, a CORESET pool index value.

FIG. 14 is a flowchart illustrating an example process 1400 performed, for example, by a UE that supports TCI states for different operating states in accordance with the present disclosure. Example process 1400 is an example where the UE (for example, UE 120) performs operations associated with TCI states for different operating states.

As shown in FIG. 14, in some aspects, process 1400 may include receiving a first communication that activates one or more TCI states associated with respective operating states that are associated with a pattern indicating time intervals associated with the respective operating states (block 1410). For example, the UE (such as by using communication manager 140 or reception component 1602, depicted in FIG. 16) may receive a first communication that activates one or more TCI states associated with respective operating states that are associated with a pattern indicating time intervals associated with the respective operating states, as described above.

As further shown in FIG. 14, in some aspects, process 1400 may include transmitting or receiving, during a time interval of the time intervals, a second communication using a TCI state, of the one or more TCI states, that is associated with an operating state associated with the time interval as indicated by the pattern (block 1420). For example, the UE (such as by using communication manager 140, transmission component 1604, or reception component 1602, depicted in FIG. 16) may transmit or receive, during a time interval of the time intervals, a second communication using a TCI state, of the one or more TCI states, that is associated with an operating state associated with the time interval as indicated by the pattern, as described above.

Process 1400 may include additional aspects, such as any single aspect or any combination of aspects described below or in connection with one or more other processes described elsewhere herein.

In a first additional aspect, the operating states include duplex modes of a network node, the duplex modes including at least one of a full-duplex mode, a non-full-duplex mode, a half-duplex mode, or a subband-full-duplex mode.

In a second additional aspect, alone or in combination with the first aspect, the operating states are associated with a network node associated with the first communication and the second communication.

In a third additional aspect, alone or in combination with one or more of the first and second aspects, the one or more TCI states include a downlink TCI state associated with a first one or more operating states of the operating states, and an uplink TCI state associated with a second one or more operating states of the operating states.

In a fourth additional aspect, alone or in combination with one or more of the first through third aspects, at least one of the first one or more operating states or the second one or more operating states includes all of the operating states.

In a fifth additional aspect, alone or in combination with one or more of the first through fourth aspects, the one or more TCI states include at least one of a joint downlink and uplink TCI state associated with a first one or more operating states of the operating states, a downlink TCI state associated with a second one or more operating states of the operating states, or an uplink TCI state associated with a third one or more operating states of the operating states.

In a sixth additional aspect, alone or in combination with one or more of the first through fifth aspects, the first communication maps at least one TCI state, of the one or more TCI states, to a TCI codepoint, the TCI codepoint being associated with one or more operating states that are associated with the at least one TCI state.

In a seventh additional aspect, alone or in combination with one or more of the first through sixth aspects, process 1400 includes receiving downlink control information indicating the TCI codepoint, the TCI state being included in the at least one TCI state associated with receiving the downlink control information indicating the TCI codepoint.

In an eighth additional aspect, alone or in combination with one or more of the first through seventh aspects, the at least one TCI state includes a first one or more TCI states associated with a first operating state and a second one or more TCI states associated with a second operating state, and process 1400 includes receiving downlink control information indicating the TCI codepoint, and the TCI state, associated with the second communication, is included in the first one or more TCI states associated with the operating state being the first operating state, or the second one or more TCI states associated with the operating state being the second operating state.

In a ninth additional aspect, alone or in combination with one or more of the first through eighth aspects, the at least one TCI state includes the TCI state, and process 1400 includes receiving downlink control information indicating the TCI codepoint, and the second communication is associated with the TCI state based on, in response to, or otherwise associated with receiving the downlink control information.

In a tenth additional aspect, alone or in combination with one or more of the first through ninth aspects, receiving the first communication includes receiving separate MAC-CE communications for each of the operating states, and a MAC-CE communication, of the MAC-CE communications, indicates TCI states that are activated for a corresponding operating state.

In an eleventh additional aspect, alone or in combination with one or more of the first through tenth aspects, receiving the first communication includes receiving a first MAC-CE communication indicating a first at least one TCI state, of the one or more TCI states, that is activated for a first operating state of the operating states, and receiving a second MAC-CE communication indicating a second at least one TCI state, of the one or more TCI states, that is activated for a second operating state of the operating states.

In a twelfth additional aspect, alone or in combination with one or more of the first through eleventh aspects, process 1400 includes receiving downlink control information indicating a TCI codepoint, the downlink control information being associated with the operating state, and the TCI state being included in the first at least one TCI state associated with the operating state being the first operating state, or the second at least one TCI state associated with the operating state being the second operating state.

In a thirteenth additional aspect, alone or in combination with one or more of the first through twelfth aspects, a format of the downlink control information indicates that the downlink control information is associated with the operating state.

In a fourteenth additional aspect, alone or in combination with one or more of the first through thirteenth aspects, the downlink control information includes an indication that the downlink control information is associated with the operating state.

In a fifteenth additional aspect, alone or in combination with one or more of the first through fourteenth aspects, a reception timing of the downlink control information indicates that the downlink control information is associated with the operating state.

In a sixteenth additional aspect, alone or in combination with one or more of the first through fifteenth aspects, the TCI state is associated with the operating states, and the TCI state is associated with one or more TCI states associated with uplink communications, and one or more TCI states associated with downlink communications.

In a seventeenth additional aspect, alone or in combination with one or more of the first through sixteenth aspects, the one or more TCI states are further associated with respective CORESET pool index values.

In an eighteenth additional aspect, alone or in combination with one or more of the first through seventeenth aspects, the TCI state is associated with a CORESET pool index value that is associated with the second communication.

In a nineteenth additional aspect, alone or in combination with one or more of the first through eighteenth aspects, the operating states are associated with at least one of an antenna configuration, an energy saving mode of a network node, or an operational status of a TRP.

In a twentieth additional aspect, alone or in combination with one or more of the first through nineteenth aspects, the one or more TCI states are unified TCI states.

In a twenty-first additional aspect, alone or in combination with one or more of the first through twentieth aspects, the time intervals include slots or OFDM symbols.

Although FIG. 14 shows example blocks of process 1400, in some aspects, process 1400 may include additional blocks, fewer blocks, different blocks, or differently arranged blocks than those depicted in FIG. 14. Additionally or alternatively, two or more of the blocks of process 1400 may be performed in parallel.

FIG. 15 is a flowchart illustrating an example process 1500 performed, for example, by a network node that supports TCI states for different operating states in accordance with the present disclosure. Example process 1500 is an example where the network node (for example, network node 110) performs operations associated with TCI states for different operating states.

As shown in FIG. 15, in some aspects, process 1500 may include transmitting a first communication that activates one or more TCI states associated with respective operating states that are associated with a pattern indicating time intervals associated with the respective operating states (block 1510). For example, the network node (such as by using communication manager 150 or transmission component 1704, depicted in FIG. 17) may transmit a first communication that activates one or more TCI states associated with respective operating states that are associated with a pattern indicating time intervals associated with the respective operating states, as described above.

As further shown in FIG. 15, in some aspects, process 1500 may include transmitting or receiving, during a time interval of the time intervals, a second communication using a TCI state, of the one or more TCI states, that is associated with an operating state associated with the time interval as indicated by the pattern (block 1520). For example, the network node (such as by using communication manager 150, transmission component 1704, or reception component 1702, depicted in FIG. 17) may transmit or receive, during a time interval of the time intervals, a second communication using a TCI state, of the one or more TCI states, that is associated with an operating state associated with the time interval as indicated by the pattern, as described above.

Process 1500 may include additional aspects, such as any single aspect or any combination of aspects described below or in connection with one or more other processes described elsewhere herein.

In a first additional aspect, the operating states include duplex modes of the network node, the duplex modes including at least one of a full-duplex mode, a non-full-duplex mode, a half-duplex mode, or a subband-full-duplex mode.

In a second additional aspect, alone or in combination with the first aspect, the operating states are associated with the network node.

In a third additional aspect, alone or in combination with one or more of the first and second aspects, the one or more TCI states include a downlink TCI state associated with a first one or more operating states of the operating states, and an uplink TCI state associated with a second one or more operating states of the operating states.

In a fourth additional aspect, alone or in combination with one or more of the first through third aspects, at least one of the first one or more operating states or the second one or more operating states includes all of the operating states.

In a fifth additional aspect, alone or in combination with one or more of the first through fourth aspects, the one or more TCI states include at least one of a joint downlink and uplink TCI state associated with a first one or more operating states of the operating states, a downlink TCI state associated with a second one or more operating states of the operating states, or an uplink TCI state associated with a third one or more operating states of the operating states.

In a sixth additional aspect, alone or in combination with one or more of the first through fifth aspects, the first communication maps at least one TCI state, of the one or more TCI states, to a TCI codepoint, the TCI codepoint being associated with one or more operating states that are associated with the at least one TCI state.

In a seventh additional aspect, alone or in combination with one or more of the first through sixth aspects, process 1500 includes transmitting downlink control information indicating the TCI codepoint, the TCI state being included in the at least one TCI state associated with transmitting the downlink control information indicating the TCI codepoint.

In an eighth additional aspect, alone or in combination with one or more of the first through seventh aspects, the at least one TCI state includes a first one or more TCI states associated with a first operating state and a second one or more TCI states associated with a second operating state, and process 1500 includes transmitting downlink control information indicating the TCI codepoint, and the TCI state, associated with the second communication, is included in the first one or more TCI states associated with the operating state being the first operating state, or the second one or more TCI states associated with the operating state being the second operating state.

In a ninth additional aspect, alone or in combination with one or more of the first through eighth aspects, the at least one TCI state includes the TCI state, and process 1500 includes transmitting downlink control information indicating the TCI codepoint, and the second communication is associated with the TCI state based on, in response to, or otherwise associated with transmitting the downlink control information.

In a tenth additional aspect, alone or in combination with one or more of the first through ninth aspects, transmitting the first communication includes receiving separate MAC-CE communications for each of the operating states, and a MAC-CE communication, of the MAC-CE communications, indicates TCI states that are activated for a corresponding operating state.

In an eleventh additional aspect, alone or in combination with one or more of the first through tenth aspects, transmitting the first communication includes transmitting a first MAC-CE communication indicating a first at least one TCI state, of the one or more TCI states, that are activated for a first operating state of the operating states, and transmitting a second MAC-CE communication indicating a second at least one TCI state, of the one or more TCI states, that are activated for a second operating state of the operating states.

In a twelfth additional aspect, alone or in combination with one or more of the first through eleventh aspects, process 1500 includes transmitting downlink control information indicating a TCI codepoint, the downlink control information being associated with the operating state, and the TCI state being included in the first at least one TCI state associated with the operating state being the first operating state, or the second at least one TCI state associated with the operating state being the second operating state.

In a thirteenth additional aspect, alone or in combination with one or more of the first through twelfth aspects, a format of the downlink control information indicates that the downlink control information is associated with the operating state.

In a fourteenth additional aspect, alone or in combination with one or more of the first through thirteenth aspects, the downlink control information includes an indication that the downlink control information is associated with the operating state.

In a fifteenth additional aspect, alone or in combination with one or more of the first through fourteenth aspects, a transmission timing of the downlink control information indicates that the downlink control information is associated with the operating state.

In a sixteenth additional aspect, alone or in combination with one or more of the first through fifteenth aspects, the TCI state is associated with the operating states, and the TCI state includes one or more TCI states associated with uplink communications, and one or more TCI states associated with downlink communications.

In a seventeenth additional aspect, alone or in combination with one or more of the first through sixteenth aspects, the one or more TCI states are further associated with respective CORESET pool index values.

In an eighteenth additional aspect, alone or in combination with one or more of the first through seventeenth aspects, the TCI state is associated with a CORESET pool index value that is associated with the second communication.

In a nineteenth additional aspect, alone or in combination with one or more of the first through eighteenth aspects, the operating states are associated with at least one of an antenna configuration of the network node, an energy saving mode of the network node, or an operational status of a TRP associated with the network node.

In a twentieth additional aspect, alone or in combination with one or more of the first through nineteenth aspects, the one or more TCI states are unified TCI states.

In a twenty-first additional aspect, alone or in combination with one or more of the first through twentieth aspects, the time intervals include slots or OFDM symbols.

Although FIG. 15 shows example blocks of process 1500, in some aspects, process 1500 may include additional blocks, fewer blocks, different blocks, or differently arranged blocks than those depicted in FIG. 15. Additionally or alternatively, two or more of the blocks of process 1500 may be performed in parallel.

Figure 16:
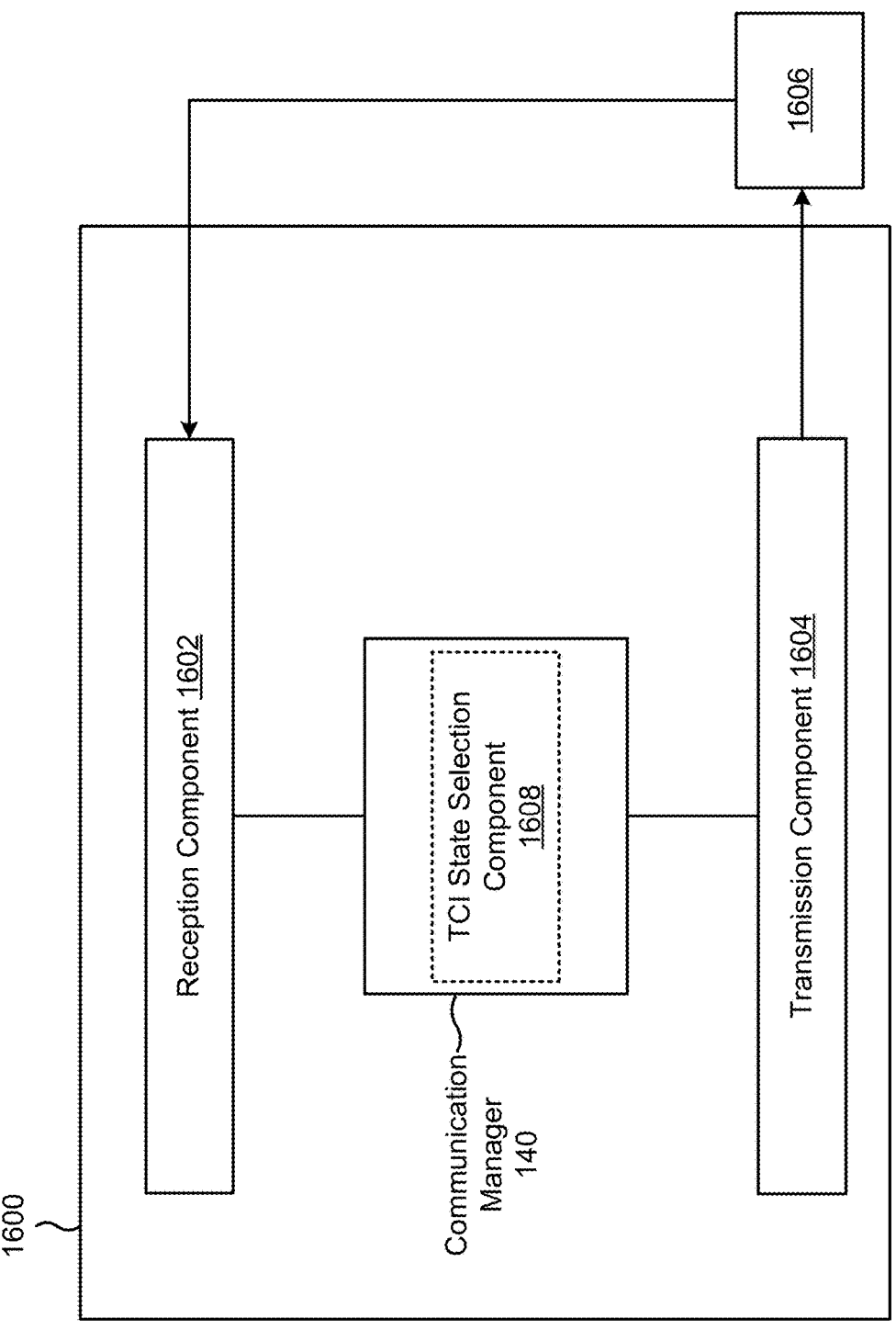
FIG. 16 is a diagram of an example apparatus for wireless communication that supports TCI states for different operating states in accordance with the present disclosure.

FIG. 16 is a diagram of an example apparatus 1600 for wireless communication that supports TCI states for different operating states in accordance with the present disclosure. The apparatus 1600 may be a UE, or a UE may include the apparatus 1600. In some aspects, the apparatus 1600 includes a reception component 1602, a transmission component 1604, and a communication manager 140, which may be in communication with one another (for example, via one or more buses). As shown, the apparatus 1600 may communicate with another apparatus 1606 (such as a UE, a network node, or another wireless communication device) using the reception component 1602 and the transmission component 1604.

In some aspects, the apparatus 1600 may be configured to and/or operable to perform one or more operations described herein in connection with FIGS. 8-13. Additionally or alternatively, the apparatus 1600 may be configured to and/or operable to perform one or more processes described herein, such as process 1400 of FIG. 14. In some aspects, the apparatus 1600 may include one or more components of the UE described above in connection with FIG. 2.

The reception component 1602 may receive communications, such as reference signals, control information, and/or data communications, from the apparatus 1606. The reception component 1602 may provide received communications to one or more other components of the apparatus 1600, such as the communication manager 140. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a modem, a demodulator, a MIMO detector, a receive processor, a controller/processor, and/or a memory of the UE described above in connection with FIG. 2.

The transmission component 1604 may transmit communications, such as reference signals, control information, and/or data communications, to the apparatus 1606. In some aspects, the communication manager 140 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, and/or a memory of the UE described above in connection with FIG. 2. In some aspects, the transmission component 1604 may be co-located with the reception component 1602 in a transceiver.

The communication manager 140 may receive or may cause the reception component 1602 to receive a first communication that activates one or more TCI states associated with respective operating states that are associated with a pattern indicating time intervals associated with the respective operating states. The communication manager 140 may transmit or may cause the transmission component 1604 to transmit and/or the communication manager 140 may receive or may cause the reception component 1602 to receive, during a time interval of the time intervals, a second communication using a TCI state, of the one or more TCI states, that is associated with an operating state associated with the time interval as indicated by the pattern. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 140 includes a set of components, such as a TCI state selection component 1608, among other examples. Alternatively, the set of components may be separate and distinct from the communication manager 140. In some aspects, one or more components of the set of components may include or may be implemented within a controller/processor, a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive a first communication that activates one or more TCI states associated with respective operating states that are associated with a pattern indicating time intervals associated with the respective operating states. The transmission component 1604 may transmit and/or the reception component 1602 may receive, during a time interval of the time intervals, a second communication using a TCI state, of the one or more TCI states, that is associated with an operating state associated with the time interval as indicated by the pattern.

The TCI state selection component 1608 may select the TCI state, from the one or more TCI states, based on, in response to, or otherwise associated with the operating state associated with the time interval.

The reception component 1602 may receive downlink control information indicating the TCI codepoint, the TCI state being included in the at least one TCI state associated with receiving the downlink control information indicating the TCI codepoint.

The reception component 1602 may receive downlink control information indicating a TCI codepoint, the downlink control information being associated with the operating state, and the TCI state being included the first at least one TCI state associated with the operating state being the first operating state, or the second at least one TCI state associated with the operating state being the second operating state.

The quantity and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
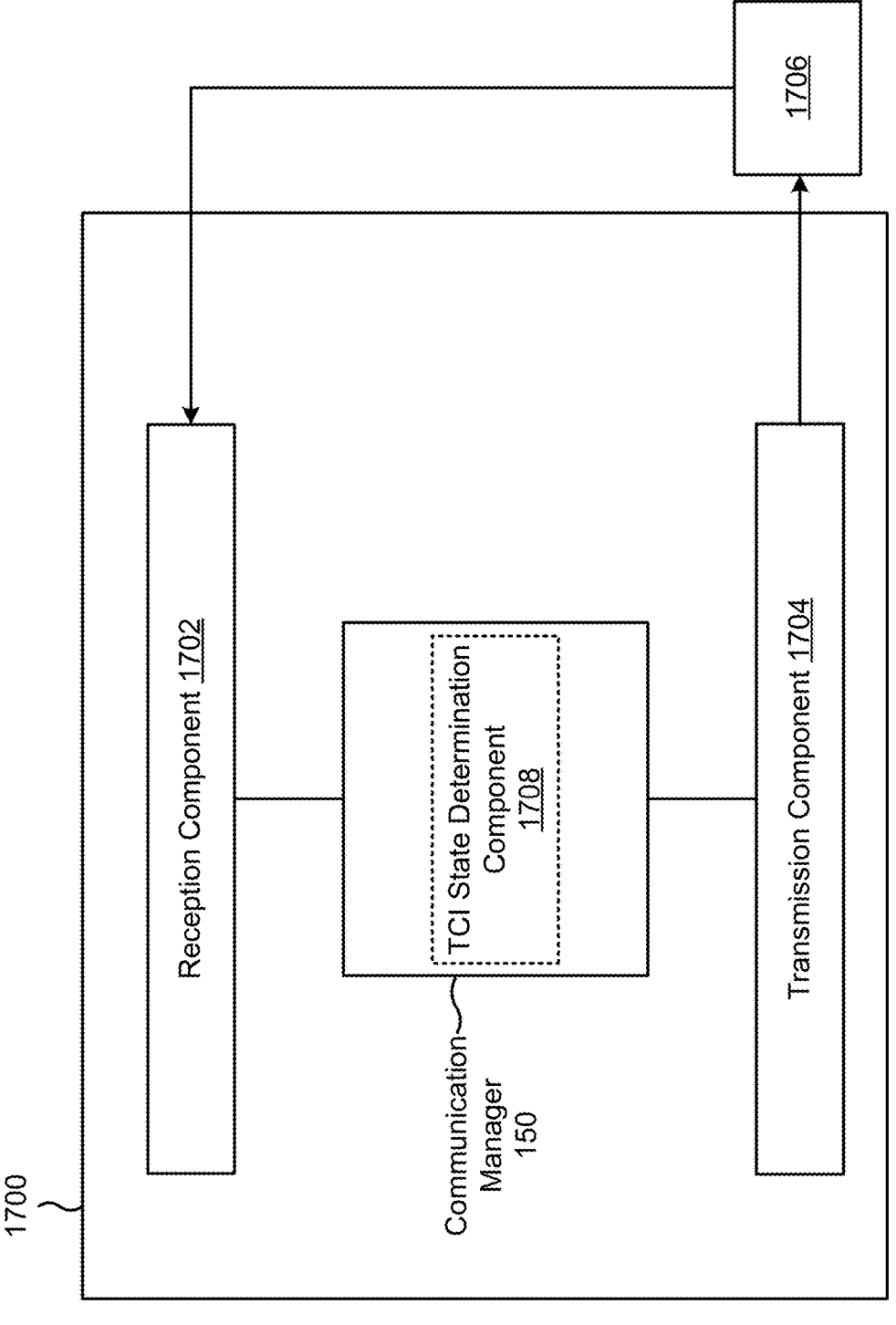
FIG. 17 is a diagram of an example apparatus for wireless communication that supports TCI states for different operating states in accordance with the present disclosure.

FIG. 17 is a diagram of an example apparatus 1700 for wireless communication that supports TCI states for different operating states in accordance with the present disclosure. The apparatus 1700 may be a network node, or a network node may include the apparatus 1700. In some aspects, the apparatus 1700 includes a reception component 1702, a transmission component 1704, and a communication manager 150, which may be in communication with one another (for example, via one or more buses). As shown, the apparatus 1700 may communicate with another apparatus 1706 (such as a UE, a network node, or another wireless communication device) using the reception component 1702 and the transmission component 1704.

In some aspects, the apparatus 1700 may be configured to and/or operable to perform one or more operations described herein in connection with FIGS. 8-13. Additionally or alternatively, the apparatus 1700 may be configured to and/or operable to perform one or more processes described herein, such as process 1500 of FIG. 15. In some aspects, the apparatus 1700 may include one or more components of the network node described above in connection with FIG. 2.

The reception component 1702 may receive communications, such as reference signals, control information, and/or data communications, from the apparatus 1706. The reception component 1702 may provide received communications to one or more other components of the apparatus 1700, such as the communication manager 150. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1702 may include one or more antennas, a modem, a demodulator, a MIMO detector, a receive processor, a controller/processor, and/or a memory of the network node described above in connection with FIG. 2.

The transmission component 1704 may transmit communications, such as reference signals, control information, and/or data communications, to the apparatus 1706. In some aspects, the communication manager 150 may generate communications and may transmit the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, and/or a memory of the network node described above in connection with FIG. 2. In some aspects, the transmission component 1704 may be co-located with the reception component 1702 in a transceiver.

The communication manager 150 may transmit or may cause the transmission component 1704 to transmit a first communication that activates one or more TCI states associated with respective operating states that are associated with a pattern indicating time intervals associated with the respective operating states. The communication manager 150 may transmit or may cause the transmission component 1704 to transmit and/or the communication manager 150 may receive or may cause the reception component 1702 to receive, during a time interval of the time intervals, a second communication using a TCI state, of the one or more TCI states, that is associated with an operating state associated with the time interval as indicated by the pattern. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a TCI state determination component 1708, among other examples. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1704 may transmit a first communication that activates one or more TCI states associated with respective operating states that are associated with a pattern indicating time intervals associated with the respective operating states. The transmission component 1704 may transmit and/or the reception component 1702 may receive, during a time interval of the time intervals, a second communication using a TCI state, of the one or more TCI states, that is associated with an operating state associated with the time interval as indicated by the pattern.

The TCI state determination component 1708 may determine the one or more TCI states based on, in response to, or otherwise associated with the respective operating states. In some aspects, the TCI state determination component 1708 may determine the one or more TCI states based on, in response to, or otherwise associated with spatial isolation characteristics of antennas and/or TRPs and based on, in response to, or otherwise associated with the respective operating states.

The transmission component 1704 may transmit downlink control information indicating the TCI codepoint, the TCI state being included in the at least one TCI state associated with transmitting the downlink control information indicating the TCI codepoint.

The transmission component 1704 may transmit downlink control information indicating a TCI codepoint, the downlink control information being associated with the operating state, and the TCI state being included the first at least one TCI state associated with the operating state being the first operating state, or the second at least one TCI state associated with the operating state being the second operating state.

The quantity and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving a first communication that activates one or more transmission configuration indicator (TCI) states associated with respective operating states that are associated with a pattern indicating time intervals associated with the respective operating states; and transmitting or receiving, during a time interval of the time intervals, a second communication using a TCI state, of the one or more TCI states, that is associated with an operating state associated with the time interval as indicated by the pattern.

Aspect 2: The method of Aspect 1, wherein the operating states include duplex modes of a network node, the duplex modes including at least one of a full-duplex mode, a non-full-duplex mode, a half-duplex mode, or a subband-full-duplex mode.

Aspect 3: The method of any of Aspects 1-2, wherein the operating states are associated with a network node associated with the first communication and the second communication.

Aspect 4: The method of any of Aspects 1-3, wherein the one or more TCI states include a downlink TCI state associated with a first one or more operating states of the operating states, and an uplink TCI state associated with a second one or more operating states of the operating states.

Aspect 5: The method of Aspect 4, wherein at least one of the first one or more operating states or the second one or more operating states includes all of the operating states.

Aspect 6: The method of any of Aspects 1-5, wherein the one or more TCI states include at least one of: a joint downlink and uplink TCI state associated with a first one or more operating states of the operating states, a downlink TCI state associated with a second one or more operating states of the operating states, or an uplink TCI state associated with a third one or more operating states of the operating states.

Aspect 7: The method of any of Aspects 1-6, wherein the first communication maps at least one TCI state, of the one or more TCI states, to a TCI codepoint, the TCI codepoint being associated with one or more operating states that are associated with the at least one TCI state.

Aspect 8: The method of Aspect 7, further comprising: receiving downlink control information indicating the TCI codepoint, the TCI state being included in the at least one TCI state associated with receiving the downlink control information indicating the TCI codepoint.

Aspect 9: The method of any of Aspects 7-8, wherein the at least one TCI state includes a first one or more TCI states associated with a first operating state and a second one or more TCI states associated with a second operating state, the method further comprising: receiving downlink control information indicating the TCI codepoint, wherein the TCI state, associated with the second communication, is included in: the first one or more TCI states associated with the operating state being the first operating state, or the second one or more TCI states associated with the operating state being the second operating state.

Aspect 10: The method of any of Aspects 7-9, wherein the at least one TCI state includes the TCI state, the method further comprising: receiving downlink control information indicating the TCI codepoint, wherein the second communication is associated with the TCI state associated with receiving the downlink control information.

Aspect 11: The method of any of Aspects 1-10, wherein receiving the first communication comprises receiving separate medium access control (MAC) control element (MAC-CE) communications for each of the operating states, and a MAC-CE communication, of the MAC-CE communications, indicates TCI states that are activated for a corresponding operating state.

Aspect 12: The method of any of Aspects 1-11, wherein receiving the first communication comprises: receiving a first medium access control (MAC) control element (MAC-CE) communication indicating a first at least one TCI state, of the one or more TCI states, that is activated for a first operating state of the operating states; and receiving a second MAC-CE communication indicating a second at least one TCI state, of the one or more TCI states, that is activated for a second operating state of the operating states.

Aspect 13: The method of Aspect 12, further comprising: receiving downlink control information indicating a TCI codepoint, the downlink control information being associated with the operating state, and the TCI state being included in: the first at least one TCI state associated with the operating state being the first operating state, or the second at least one TCI state associated with the operating state being the second operating state.

Aspect 14: The method of Aspect 13, wherein a format of the downlink control information indicates that the downlink control information is associated with the operating state.

Aspect 15: The method of Aspect 13, wherein the downlink control information includes an indication that the downlink control information is associated with the operating state.

Aspect 16: The method of Aspect 13, wherein a reception timing of the downlink control information indicates that the downlink control information is associated with the operating state.

Aspect 17: The method of any of Aspects 1-16, wherein the TCI state is associated with the operating states, and the TCI state is associated with: one or more TCI states associated with uplink communications, and one or more TCI states associated with downlink communications.

Aspect 18: The method of any of Aspects 1-17, wherein the one or more TCI states are further associated with respective control resource set (CORESET) pool index values.

Aspect 19: The method of Aspect 18, wherein the TCI state is associated with a CORESET pool index value that is associated with the second communication.

Aspect 20: The method of any of Aspects 1-19, wherein the operating states are associated with at least one of: an antenna configuration, an energy saving mode of a network node, or an operational status of a transmission reception point (TRP).

Aspect 21: The method of any of Aspects 1-20, wherein the one or more TCI states are unified TCI states.

Aspect 22: The method of any of Aspects 1-21, wherein the time intervals include slots or orthogonal frequency-division multiplexing (OFDM) symbols.

Aspect 23: A method of wireless communication performed by a network node, comprising: transmitting a first communication that activates one or more transmission configuration indicator (TCI) states associated with respective operating states that are associated with a pattern indicating time intervals associated with the respective operating states; and transmitting or receiving, during a time interval of the time intervals, a second communication using a TCI state, of the one or more TCI states, that is associated with an operating state associated with the time interval as indicated by the pattern.

Aspect 24: The method of Aspect 23, wherein the operating states include duplex modes of the network node, the duplex modes including at least one of a full-duplex mode, a non-full-duplex mode, a half-duplex mode, or a subband-full-duplex mode.

Aspect 25: The method of any of Aspects 23-24, wherein the operating states are associated with the network node.

Aspect 26: The method of any of Aspects 23-25, wherein the one or more TCI states include a downlink TCI state associated with a first one or more operating states of the operating states, and an uplink TCI state associated with a second one or more operating states of the operating states.

Aspect 27: The method of Aspect 26, wherein at least one of the first one or more operating states or the second one or more operating states includes all of the operating states.

Aspect 28: The method of any of Aspects 23-27, wherein the one or more TCI states include at least one of: a joint downlink and uplink TCI state associated with a first one or more operating states of the operating states, a downlink TCI state associated with a second one or more operating states of the operating states, or an uplink TCI state associated with a third one or more operating states of the operating states.

Aspect 29: The method of any of Aspects 23-28, wherein the first communication maps at least one TCI state, of the one or more TCI states, to a TCI codepoint, the TCI codepoint being associated with one or more operating states that are associated with the at least one TCI state.

Aspect 30: The method of Aspect 29, further comprising: transmitting downlink control information indicating the TCI codepoint, the TCI state being included in the at least one TCI state associated with transmitting the downlink control information indicating the TCI codepoint.

Aspect 31: The method of any of Aspects 29-30, wherein the at least one TCI state includes a first one or more TCI states associated with a first operating state and a second one or more TCI states associated with a second operating state, the method further comprising: transmitting downlink control information indicating the TCI codepoint, wherein the TCI state, associated with the second communication, is included in: the first one or more TCI states associated with the operating state being the first operating state, or the second one or more TCI states associated with the operating state being the second operating state.

Aspect 32: The method of any of Aspects 29-31, wherein the at least one TCI state includes the TCI state, the method further comprising: transmitting downlink control information indicating the TCI codepoint, wherein the second communication is associated with the TCI state associated with transmitting the downlink control information.

Aspect 33: The method of any of Aspects 23-32, wherein transmitting the first communication comprises receiving separate medium access control (MAC) control element (MAC-CE) communications for each of the operating states, and a MAC-CE communication, of the MAC-CE communications, indicates TCI states that are activated for a corresponding operating state.

Aspect 34: The method of any of Aspects 23-33, wherein transmitting the first communication comprises: transmitting a first medium access control (MAC) control element (MAC-CE) communication indicating a first at least one TCI state, of the one or more TCI states, that are activated for a first operating state of the operating states; and transmitting a second MAC-CE communication indicating a second at least one TCI state, of the one or more TCI states, that are activated for a second operating state of the operating states.

Aspect 35: The method of Aspect 34, further comprising: transmitting downlink control information indicating a TCI codepoint, the downlink control information being associated with the operating state, and the TCI state being included in: the first at least one TCI state associated with the operating state being the first operating state, or the second at least one TCI state associated with the operating state being the second operating state.

Aspect 36: The method of Aspect 35, wherein a format of the downlink control information indicates that the downlink control information is associated with the operating state.

Aspect 37: The method of Aspect 35, wherein the downlink control information includes an indication that the downlink control information is associated with the operating state.

Aspect 38: The method of Aspect 35, wherein a transmission timing of the downlink control information indicates that the downlink control information is associated with the operating state.

Aspect 39: The method of any of Aspects 23-38, wherein the TCI state is associated with the operating states, and the TCI state includes: one or more TCI states associated with uplink communications, and one or more TCI states associated with downlink communications.

Aspect 40: The method of any of Aspects 23-39, wherein the one or more TCI states are further associated with respective control resource set (CORESET) pool index values.

Aspect 41: The method of Aspect 40, wherein the TCI state is associated with a CORESET pool index value that is associated with the second communication.

Aspect 42: The method of any of Aspects 23-41, wherein the operating states are associated with at least one of: an antenna configuration of the network node, an energy saving mode of the network node, or an operational status of a transmission reception point (TRP) associated with the network node.

Aspect 43: The method of any of Aspects 23-42, wherein the one or more TCI states are unified TCI states.

Aspect 44: The method of any of Aspects 23-43, wherein the time intervals include slots or orthogonal frequency-division multiplexing (OFDM) symbols.

Aspect 45: An apparatus for wireless communication at a device, comprising a processor; memory coupled with the processor; and instructions stored in the memory and executable by the processor to cause the apparatus to perform the method of one or more of Aspects 1-44.

Aspect 46: A device for wireless communication, comprising a memory and one or more processors coupled to the memory, the one or more processors configured to perform the method of one or more of Aspects 1-44.

Aspect 47: An apparatus for wireless communication, comprising at least one means for performing the method of one or more of Aspects 1-44.

Aspect 48: A non-transitory computer-readable medium storing code for wireless communication, the code comprising instructions executable by a processor to perform the method of one or more of Aspects 1-44.

Aspect 49: A non-transitory computer-readable medium storing a set of instructions for wireless communication, the set of instructions comprising one or more instructions that, when executed by one or more processors of a device, cause the device to perform the method of one or more of Aspects 1-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. Also, "determining" can include resolving, selecting, obtaining, choosing, establishing and other such similar actions.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor coupled with the at least one memory, the at least one processor operable to cause the UE to:

receive configuration information that indicates a pattern specifying a plurality of time intervals during which respective operating states are active;

receive a first communication that activates a respective one or more transmission configuration indicator (TCI) states associated with transmitting or receiving communications while operating in each of the respective operating states; and transmit or receive, during a time interval of the time intervals, a second communication using a TCI state, of the one or more TCI states, that is associated with an operating state associated with the time interval as indicated by the pattern.

2. The UE of claim 1, wherein the respective operating states include duplex modes of a network node, the duplex modes including at least one of a full-duplex mode, a non-full-duplex mode, a half-duplex mode, or a subband-full-duplex mode.

3. The UE of claim 1, wherein the respective operating states are associated with a network node associated with the first communication and the second communication.

4. The UE of claim 1, wherein the one or more TCI states include a downlink TCI state associated with a first one or more operating states of the respective operating states, and an uplink TCI state associated with a second one or more operating states of the respective operating states.

5. The UE of claim 4, wherein at least one of the first one or more operating states or the second one or more operating states includes all of the respective operating states.

6. The UE of claim 1, wherein the one or more TCI states include at least one of:

a joint downlink and uplink TCI state associated with a first one or more operating states of the respective operating states, a downlink TCI state associated with a second one or more operating states of the respective operating states, or an uplink TCI state associated with a third one or more operating states of the respective operating states.

7. The UE of claim 1, wherein the first communication maps at least one TCI state, of the one or more TCI states, to a TCI codepoint, the TCI codepoint being associated with one or more operating states that are associated with the at least one TCI state.

8. The UE of claim 7, wherein the at least one processor is further operable to cause the UE to:

receive downlink control information indicating the TCI codepoint, the TCI state being included in the at least one TCI state associated with receiving the downlink control information indicating the TCI codepoint.

9. The UE of claim 7, wherein the at least one TCI state includes a first one or more TCI states associated with a first operating state and a second one or more TCI states associated with a second operating state, wherein the at least one processor is further operable to cause the UE to:

receive downlink control information indicating the TCI codepoint, wherein the TCI state, associated with the second communication, is included in:

the first one or more TCI states associated with the operating state being the first operating state, or the second one or more TCI states associated with the operating state being the second operating state.

10. The UE of claim 7, wherein the at least one TCI state includes the TCI state, wherein the at least one processor is further operable to cause the UE to:

receive downlink control information indicating the TCI codepoint, wherein the second communication is associated with the TCI state associated with receiving the downlink control information.

11. The UE of claim 1, wherein, to cause the UE to receive the first communication, the at least one processor is operable to cause the UE to receive separate medium access control (MAC) control element (MAC-CE) communications for each of the respective operating states, and a MAC-CE communication, of the MAC-CE communications, indicates TCI states that are activated for a corresponding operating state.

12. A network node for wireless communication, comprising:

at least one memory; and at least one processor coupled with the at least one memory, the at least one processor operable to cause the network node to:

transmit configuration information that indicates a pattern specifying a plurality of time intervals during which respective operating states are active;

transmit a first communication that activates a respective one or more transmission configuration indicator (TCI) states associated with transmitting or receiving communications while operating in each of the respective operating states; and transmit or receive, during a time interval of the time intervals, a second communication using a TCI state, of the one or more TCI states, that is associated with an operating state associated with the time interval as indicated by the pattern.

13. The network node of claim 12, wherein the respective operating states include duplex modes of the network node, the duplex modes including at least one of a full-duplex mode, a non-full-duplex mode, a half-duplex mode, or a subband-full-duplex mode.

14. The network node of claim 12, wherein the respective operating states are associated with the network node.

15. The network node of claim 12, wherein the one or more TCI states include a downlink TCI state associated with a first one or more operating states of the respective operating states, and an uplink TCI state associated with a second one or more operating states of the respective operating states.

16. The network node of claim 12, wherein the one or more TCI states include at least one of:

a joint downlink and uplink TCI state associated with a first one or more operating states of the respective operating states, a downlink TCI state associated with a second one or more operating states of the respective operating states, or an uplink TCI state associated with a third one or more operating states of the respective operating states.

17. A method of wireless communication performed by a user equipment (UE), comprising:

receiving configuration information that indicates a pattern specifying a plurality of time intervals during which respective operating states are active;

receiving a first communication that activates a respective one or more transmission configuration indicator (TCI) states associated with transmitting or receiving communications while operating in each of the respective operating states; and transmitting or receiving, during a time interval of the time intervals, a second communication using a TCI state, of the one or more TCI states, that is associated with an operating state associated with the time interval as indicated by the pattern.

18. The method of claim 17, wherein receiving the first communication comprises:

receiving a first medium access control (MAC) control element (MAC-CE) communication indicating a first at least one TCI state, of the one or more TCI states, that is activated for a first operating state of the respective operating states; and

receiving a second MAC-CE communication indicating a second at least one TCI state, of the one or more TCI states, that is activated for a second operating state of the respective operating states.

19. The method of claim 18, further comprising: receiving downlink control information indicating a TCI codepoint, the downlink control information being associated with the operating state, and the TCI state being included in:

the first at least one TCI state associated with the operating state being the first operating state, or the second at least one TCI state associated with the operating state being the second operating state.

20. The method of claim 19, wherein a format of the downlink control information indicates that the downlink control information is associated with the operating state.

21. The method of claim 19, wherein the downlink control information includes an indication that the downlink control information is associated with the operating state.

22. The method of claim 19, wherein a reception timing of the downlink control information indicates that the downlink control information is associated with the operating state.

23. The method of claim 17, wherein the TCI state is associated with the respective operating states, and the TCI state is associated with:

one or more TCI states associated with uplink communications, and one or more TCI states associated with downlink communications.

24. The method of claim 17, wherein the one or more TCI states are further associated with respective control resource set (CORESET) pool index values.

25. The method of claim 24, wherein the TCI state is associated with a CORESET pool index value that is associated with the second communication.

26. A method of wireless communication performed by a network node, comprising:

transmitting configuration information that indicates a pattern specifying a plurality of time intervals during which respective operating states are active;

transmitting a first communication that activates a respective one or more transmission configuration indicator (TCI) states associated with transmitting or receiving communications while operating in each of the respective operating states; and transmitting or receiving, during a time interval of the time intervals, a second communication using a TCI state, of the one or more TCI states, that is associated with an operating state associated with the time interval as indicated by the pattern.

27. The method of claim 26, wherein the first communication maps at least one TCI state, of the one or more TCI states, to a TCI codepoint, the TCI codepoint being associated with one or more operating states that are associated with the at least one TCI state.

28. The method of claim 27, further comprising: transmitting downlink control information indicating the TCI codepoint, the TCI state being included in the at least one TCI state associated with transmitting the downlink control information indicating the TCI codepoint.

29. The method of claim 27, wherein the at least one TCI state includes a first one or more TCI states associated with a first operating state and a second one or more TCI states associated with a second operating state, the method further comprising:

transmitting downlink control information indicating the TCI codepoint, wherein the TCI state, associated with the second communication, is included in:

the first one or more TCI states associated with the operating state being the first operating state, or the second one or more TCI states associated with the operating state being the second operating state.

30. The UE of claim 1, wherein the configuration information is received via at least one of: radio resource control signaling or system information signaling.

\* \* \* \* \*